(12) United States Patent
Kim et al.

(10) Patent No.: US 9,475,408 B2
(45) Date of Patent: Oct. 25, 2016

(54) SEAT RAIL APPARATUS FOR VEHICLE HAVING WALK-IN MEMORY FUNCTION

(71) Applicants: Hyundai Motor Company, Seoul (KR); DAS CORPORATION, Gyeongju-si (KR)

(72) Inventors: Ji Hyun Kim, Anyang-si (KR); Hyeong Jong Kim, Seoul (KR); Hyeong Jun Kim, Anyang-si (KR); Seong Jun Hwang, Busan (KR); Jae Chul Jung, Ulsan (KR)

(73) Assignees: Hyundai Motor Company, Seoul (KR); DAS CORPORATION, Gyeongju-si (KR)

( * ) Notice: Subject to any disclaimer, the term of this patent is extended or adjusted under 35 U.S.C. 154(b) by 193 days.

(21) Appl. No.: 14/320,207

(22) Filed: Jun. 30, 2014

(65) Prior Publication Data

US 2015/0151650 A1    Jun. 4, 2015

(30) Foreign Application Priority Data

Dec. 3, 2013 (KR) .................. 10-2013-0149037

(51) Int. Cl.
| | |
|---|---|
| *A47C 1/00* | (2006.01) |
| *B60N 2/07* | (2006.01) |
| *B60N 2/08* | (2006.01) |
| *B60N 2/12* | (2006.01) |

(52) U.S. Cl.
CPC ........... *B60N 2/0705* (2013.01); *B60N 2/0818* (2013.01); *B60N 2/0843* (2013.01); *B60N 2/12* (2013.01); *B60N 2/123* (2013.01)

(58) Field of Classification Search
CPC ........ B60N 2/04; B60N 2/07; B60N 2/0705; B60N 2/0715; B60N 2/08; B60N 2/0825; B60N 2/0837; B60N 2/0843; B60N 2/0881; B60N 2/0887; B60N 2/123; B60N 2/0155; B60N 2/02; B60N 2/06; B60N 2/062; B60N 2/067; B60N 2/0702; B60N 2/0727
USPC .............. 248/424, 429, 430; 297/344.1, 340, 297/341, 342, 313, 314; 296/65.13, 65.14
See application file for complete search history.

(56) References Cited

U.S. PATENT DOCUMENTS

| | | | |
|---|---|---|---|
| 7,152,923 B2 * | 12/2006 | Charras .................. | B60N 2/206 297/341 |
| 7,328,877 B2 * | 2/2008 | Yamada ............... | B60N 2/0705 248/430 |

(Continued)

FOREIGN PATENT DOCUMENTS

| | | |
|---|---|---|
| EP | 2 184 200 A1 | 5/2010 |
| JP | 2006-8010 A | 1/2006 |

(Continued)

*Primary Examiner* — Terrell McKinnon
*Assistant Examiner* — Michael McDuffie
(74) *Attorney, Agent, or Firm* — Morgan, Lewis & Bockius LLP

(57) ABSTRACT

A seat rail apparatus for a vehicle may include a guide rail fixedly installed along a lower rail mounted to a bottom surface of the vehicle, a lock assembly installed to be movable along the guide rail in an unlocked state and selectively locked and unlocked with and from the guide rail as a locking pin is moved forwards and rearwards, a driving assembly integrally installed at an upper rail mounted to a cushion frame, wherein the driving assembly locks and unlocks the lock assembly with and from the guide rail by operating the locking pin and locks and unlocks the lock assembly such that the lock assembly is operated integrally with the lock assembly according to a walk-in lever, and a stopper provided at the upper rail, for contacting the lock assembly locked with the guide rail when the seat returns after a walk-in operation to stop the seat.

21 Claims, 14 Drawing Sheets

(56) References Cited

U.S. PATENT DOCUMENTS

| | | | | |
|---|---|---|---|---|
| 7,819,479 B2* | 10/2010 | Halbig | ................... | B60N 2/12 297/341 |
| 7,971,920 B2* | 7/2011 | Jang | ..................... | B60N 2/123 296/65.01 |
| 8,585,145 B2* | 11/2013 | Nock | ..................... | B60N 2/12 297/331 |
| 8,632,128 B2* | 1/2014 | Omori | ..................... | B60N 2/12 297/341 |
| 8,708,299 B2* | 4/2014 | Kitamura | ............... | B60N 2/073 248/424 |
| 2004/0011940 A1* | 1/2004 | Matsumoto | ............ | B60N 2/071 248/424 |
| 2004/0021355 A1* | 2/2004 | Ohba | ..................... | B60N 2/06 297/341 |
| 2004/0124683 A1* | 7/2004 | Matsumoto | .......... | B60N 2/0705 297/344.1 |
| 2004/0262969 A1* | 12/2004 | Sasaki | ................. | B60N 2/0705 297/344.11 |
| 2006/0214460 A1* | 9/2006 | Kojima | ............... | B60N 2/0705 296/65.13 |
| 2008/0238127 A1* | 10/2008 | Kojima | ............... | B60N 2/0705 296/65.13 |
| 2009/0026822 A1* | 1/2009 | Quast | ................... | B60N 2/0825 297/344.1 |
| 2010/0019525 A1* | 1/2010 | Yong | ..................... | B60N 2/123 296/65.15 |
| 2010/0244524 A1* | 9/2010 | Kumazaki | ............... | B60N 2/12 297/341 |
| 2011/0193389 A1* | 8/2011 | Wojatzki | .............. | B60N 2/0705 297/344.1 |
| 2011/0241401 A1* | 10/2011 | Otsuka | ................. | B60N 2/0715 297/331 |
| 2012/0223561 A1* | 9/2012 | Hurst, III | ................. | B60N 2/22 297/344.1 |
| 2013/0278033 A1* | 10/2013 | Tame | ................... | B60N 2/0818 297/344.1 |

FOREIGN PATENT DOCUMENTS

| | | |
|---|---|---|
| JP | 2006-8036 A | 1/2006 |
| JP | 2009-56912 A | 3/2009 |
| KR | 10-0759180 B1 | 9/2007 |
| KR | 10-2012-0128401 A | 11/2012 |
| KR | 10-2013-0013362 A | 2/2013 |
| WO | WO 2006/032574 A2 | 3/2006 |

* cited by examiner

SEAT RAIL APPARATUS FOR VEHICLE HAVING WALK-IN MEMORY FUNCTION

CROSS-REFERENCE TO RELATED APPLICATION

The present application claims priority to Korean Patent Application No. 10-2013-0149037, filed on Dec. 3, 2013, the entire contents of which is incorporated herein for all purposes by this reference.

BACKGROUND

1. Field of the Invention

The present invention relates to a seat rail apparatus for a vehicle, and more particularly to a seat rail apparatus for a vehicle having a walk-in memory function by which a seat can return to a position adjusted before when the seat is moved through a walk-in operation to return to an original position in a state in which the seat is adjusted to an optimum position by a passenger to correspond to the body shape of the passenger.

2. Description of Related Art

In general, a vehicle seat includes a seat cushion for supporting the hip of a user, and a seat back for supporting a back, and has various functions for convenience of a user.

For example, a user (a driver or a passenger) can push or pull a seat cushion forwards and rearwards in correspondence to his or her body shape to adjust a position of the seat cushion, and can also rotate a seat back with respect to the seat cushion by a predetermined angle.

Thereto, a vehicle seat includes a seat rail apparatus for moving an entire seat forwards and rearwards such that a position of the seat can be adjusted in correspondence to the body shape of a user, and further includes a folding apparatus for folding a seat back forwards, and a recliner apparatus for adjusting an angle of the seat back.

Here, the seat rail apparatus includes a seat track (a combination of an upper rail and a lower rail) installed between a cushion frame and a vehicle floor to move the seat forwards and rearwards, and a locking unit for locking and unlocking the upper rail mounted to the cushion frame to and from the lower rail mounted to the vehicle floor according to a manipulation of a track lever.

A walk-in seat including a walk-in function by which a seat can be moved forwards and then moved rearwards in a seat back folding state for a ride of a passenger of a back seat may be installed according to a model of a vehicle.

The walk-in function is a function for sliding a front seat forwards by using a recliner apparatus and a seat rail apparatus to help a ride of a passenger of a back seat or maximize expansion of a space, and is a function for moving an entire seat forwards while a locking unit is unlocked in conjunction with the recliner apparatus if a front seat back is folded to allow a passenger to ride a back seat or get off from the back seat.

FIGS. 1 and 2 are side views illustrating a walk-in function of a vehicle seat. An operation lever 9 (having different positions and shapes according to models of vehicles) is provided at one side of a walk-in seat to perform a walk-in function. If the operation lever 9 is manipulated, a recliner apparatus of a seat back is operated while a cable is operated in conjunction with a link and then the seat back 10 is folded forwards.

A walk-in cable is pulled further in conjunction with an operation of the recliner apparatus while the seat back 10 is folded forwards, and if the walk-in cable is pulled, a locking unit of a seat rail apparatus unlocks a lower rail to perform a walk-in operation by which the seat is slid forwards.

Meanwhile, during a walk-in return, that is, when the seat returns to a position where a user can be seated, the folded seat back is unfolded backwards when a forward and rearward position of the seat is made suitable by pushing back the seat such that a position of the seat is fixed by the locking unit.

That is, the seat back folded after the seat is moved rearwards is unfolded, an upper rail of a cushion frame is automatically locked with a lower rail of a vehicle floor by a locking unit such that a position of the seat can be fixed in its place.

However, in a conventional walk-in seat, during a walk-in return of a passenger, a seat should be moved backwards to a predetermined position (for example, a rearmost position) to be stopped, and then a position of the seat should be adjusted again in correspondence to the body shape of the passenger.

In particular, if a walk-in operation is performed while a passenger adjusts a seat to an optimum position in correspondence to the body shape of the passenger, the passenger should adjust the position of the seat to an optimum position again after being seated on the seat after walk-in return.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat rail apparatus for a vehicle having a walk-in memory function by which a seat can return to a previously adjusted position without having a troublesomeness of readjusting the position of the seat while a passenger is seated in the seat when the seat is moved through a walk-in operation and then returns to an original position (i.e., during a walk-in restoration) in a state in which the passenger optimally adjusts the position of the seat in correspondence to the body shape of the passenger.

In an aspect of the present invention, a seat rail apparatus for a vehicle may have a memory unit for setting a position of a seat that may have been adjusted to a seat return position when a walk-in operation starts to allow the seat to be moved to the set seat return position when the seat returns after the walk-in operation, the memory unit including a guide rail fixedly installed along a lower rail mounted to a bottom surface of an interior of the vehicle, a lock assembly installed to be movable along the guide rail in an unlocked state and selectively locked and unlocked with and from the guide rail as a locking pin is moved forwards and rearwards, a driving assembly integrally installed at an upper rail mounted to a cushion frame, wherein the driving assembly locks and unlocks the lock assembly with and from the guide rail by operating the locking pin and locks and unlocks the lock assembly such that the lock assembly is operated integrally with the lock assembly according to rotation of a walk-in lever, and a stopper provided at the upper rail, for contacting the lock assembly that is locked with the guide rail when the seat returns after a walk-in operation to stop the seat.

Accordingly, according to the seat rail apparatus of the present invention, by employing a memory unit for setting a position of a seat that has been adjusted in advance to a seat return position when a walk-in operation starts to allow the seat to move to the set seat return position when the seat returns after the walk-in operation, the seat can easily return to a former seat position if the seat is simply moved to a position (a set and memorized position) stopped by the memory unit without having a troublesomeness of readjusting the position of the seat while the passenger is seated when the seat returns to an original position after being moved through a walk-in operation in a state in which the passenger optimally adjusts the position of the seat in correspondence to the body shape of the passenger.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 7 and 8 are side views of the seat rail apparatus according to the exemplary embodiment of the present invention, wherein FIG. 7 shows a locked state by a locking lever and FIG. 8 shows an unlocked state.

FIG. 9 is an operation state view of the seat rail apparatus according to the exemplary embodiment of the present invention, wherein

Figure 1:
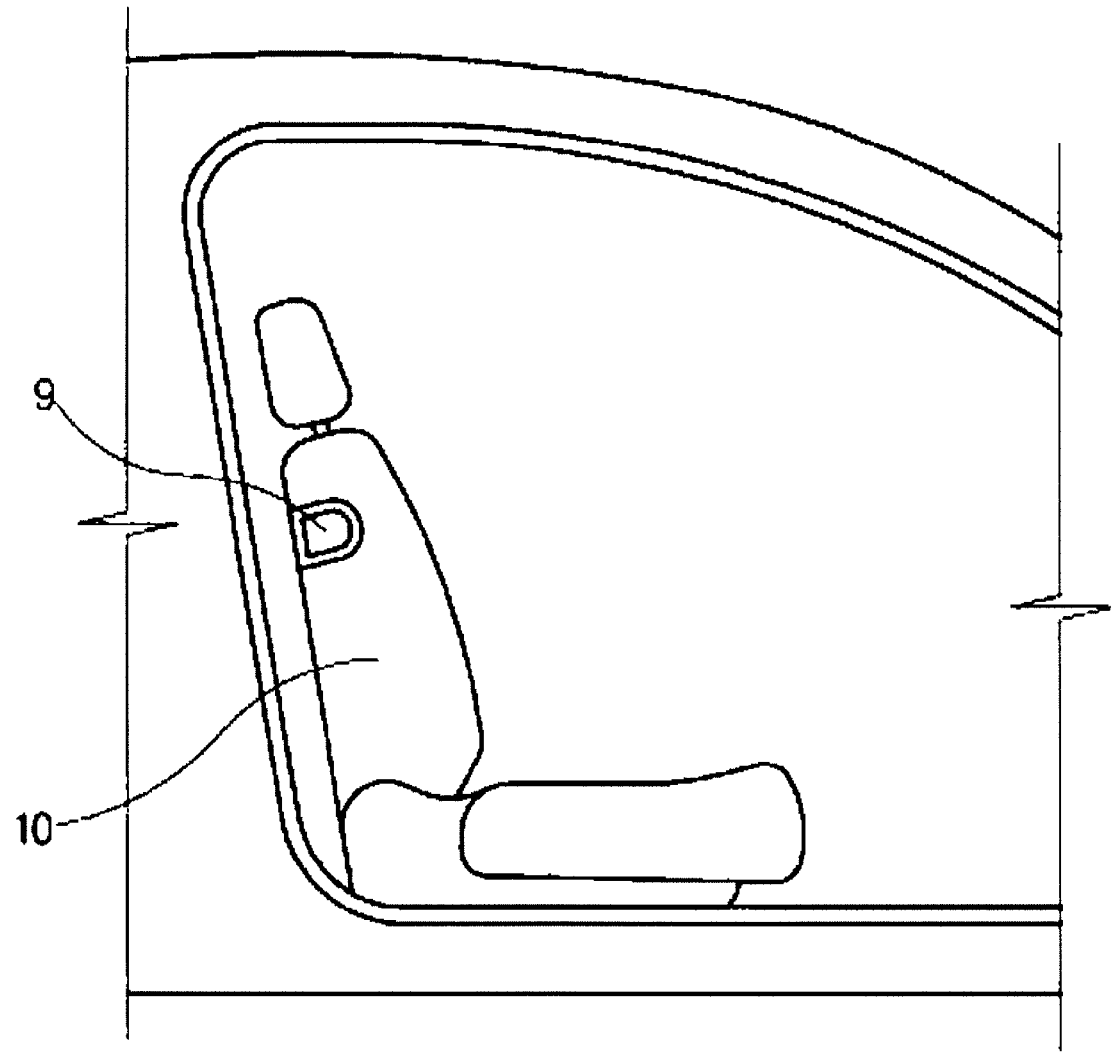
FIGS. 1 and 2 are side views illustrating a walk-in function of a vehicle seat.
Figure 2:
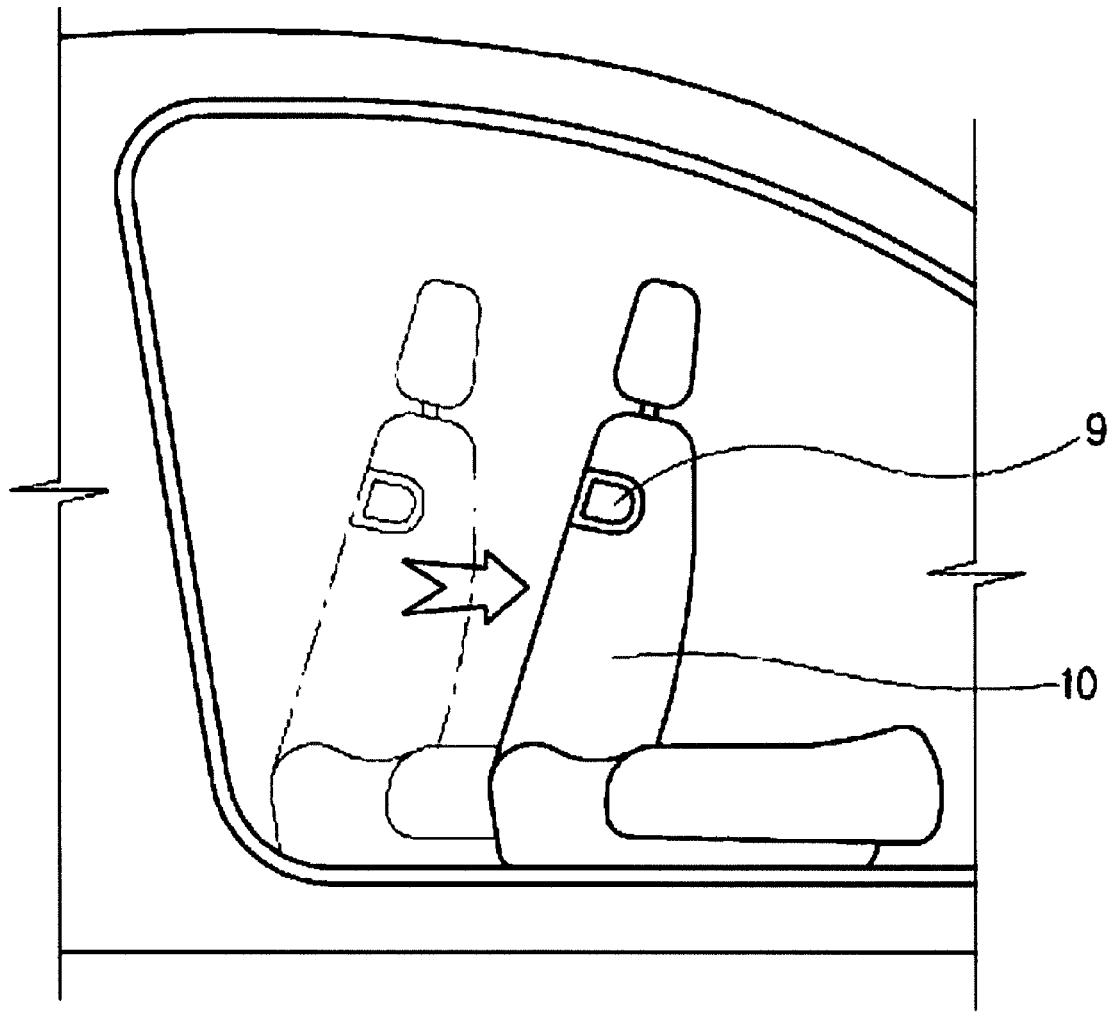

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the art to which the present invention pertains can easily carry out the present invention.

A seat rail apparatus for a vehicle according to an exemplary embodiment of the present invention has a configuration for conveniently moving a seat to a seat position (a memorized position) adjusted in advance and fixing the seat without a troublesomeness of readjusting the seat position while a passenger is seated on the seat when a walk-in apparatus is operated to move the seat forwards and return the seat rearwards such that another passenger on the rear seat can ride or get off afterwards while the passenger unlocks the seat locking unit and moves the seat in correspondence to the body shape of the passenger to adjust the position of the seat.

Thereto, the seat rail apparatus according to the exemplary embodiment of the present invention includes a memory unit of setting and memorizing a seat return position (during a walk-in return) to a seat position adjusted in advance in a mechanical method when a walk-in operation starts while a forward and rearward position of the seat is adjusted.

Accordingly, if a walk-in operation of a seat is performed while a passenger (a sitter of a walk-in seat) adjusts the position of the seat in correspondence to the body shape of the passenger, the previously adjusted position of the seat is memorized in the memory unit and is set to a seat return position, and the seat may be fixed to a previously used position again as long as the seat is simply moved rearwards to a set position during a walk-in restoration.

In the following description, the walk-in manipulation and operation means a manipulation and operation of a user manipulating an operating lever (reference numeral 9 of FIG. 1) and moving the seat forwards by folding a seat back, and the walk-in restoration and operation means a manipulation and operation of moving a seat moved forwards into a seat back folded state to return the seat to an original position, and unfolding the seat back to fix the position of the seat again.

The adjustment of a forward/rearward position of the seat means, like in a known seat for a vehicle, adjusting the position of a seat by manipulating a separate manipulation unit, for example, a track lever provided at a lower end of the seat in an unlocking direction, unlocking the seat track (unlocking an upper rail and a lower rail) by a locking unit (a locking lever described below), and moving an entire seat forwards and rearwards along a track (lower rail).

The setting of a seat return position by a memory unit means setting and memorizing a position of a seat that will return during a walk-in restoration in advance through rotation of a walk-in lever when a walk-in operation starts, and also means setting and memorizing a position of the seat adjusted in advance by a user (an optimum seat position of a user that has been used before a walk-in operation) to a seat return position during a walk-in restoration.

The seat return position is set through a mechanical operation of the memory unit, and the lock assembly of the memory unit is fixed to a rail (guide rail) of a floor of the vehicle at a previously adjusted position of the seat when a walk-in operation starts and the seat is moved forwards, in which case the lock assembly of the memory unit remains fixed to the original position (memory position) even when the seat is moved during a walk-in operation and a restoration.

Then, the seat and the upper rail are moved along the lower rail of the vehicle floor during a walk-in operation and a restoration while the lock assembly of the memory unit fixed to a rail of the vehicle floor is separated from the upper rail of the seat.

When the position of the lock assembly of the memory unit is fixed, the seat may be used at a previously adjusted position as long as the seat is moved to a memory position (the previous position of the seat) to which the lock assembly of the memory unit is fixed during a restoration after a walk-in operation to be fixed.

Hereinafter, a seat rail apparatus according to an exemplary embodiment of the present invention will be described in more detail with reference to the accompanying drawings.

Figure 3:
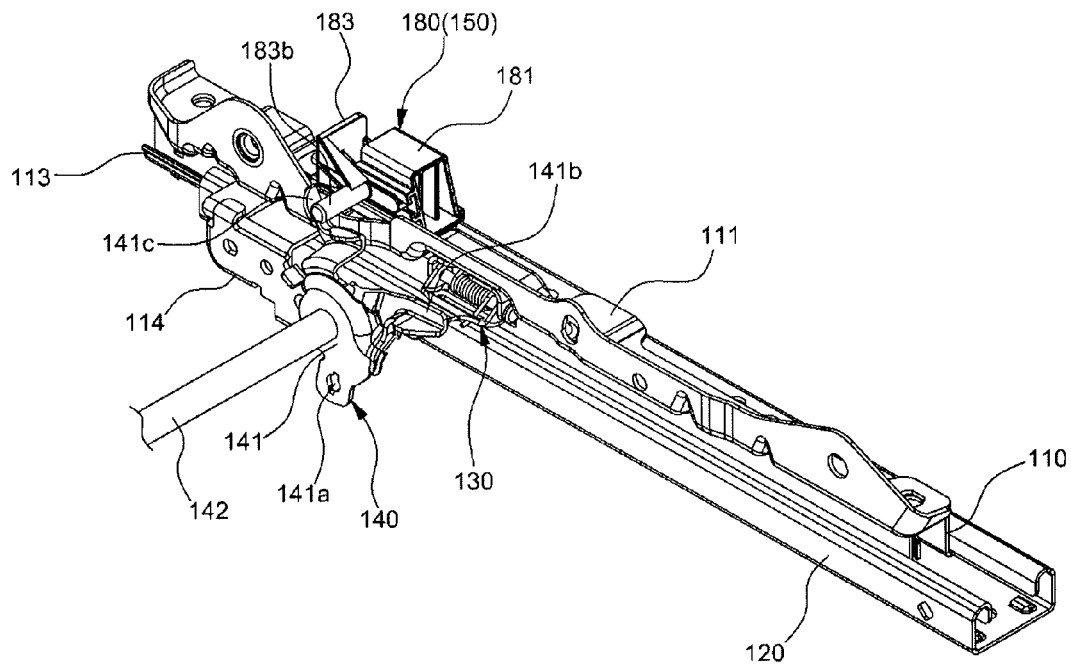
FIGS. 3 and 4 are perspective views showing a seat rail apparatus according to an exemplary embodiment of the present invention.
Figure 4:
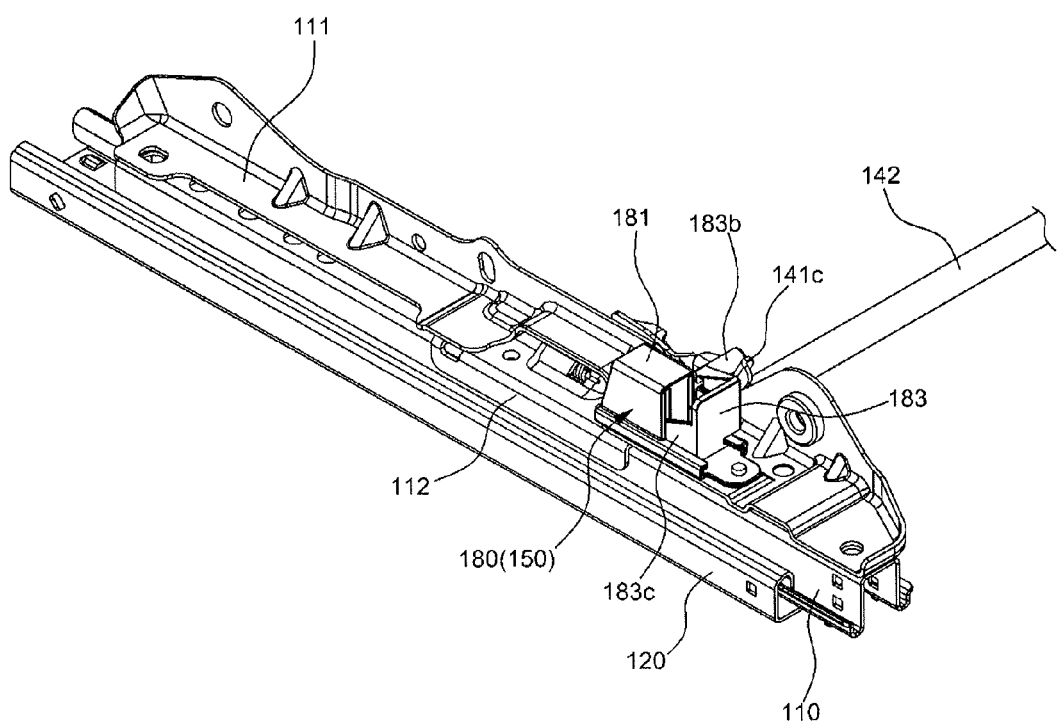
Figure 5:
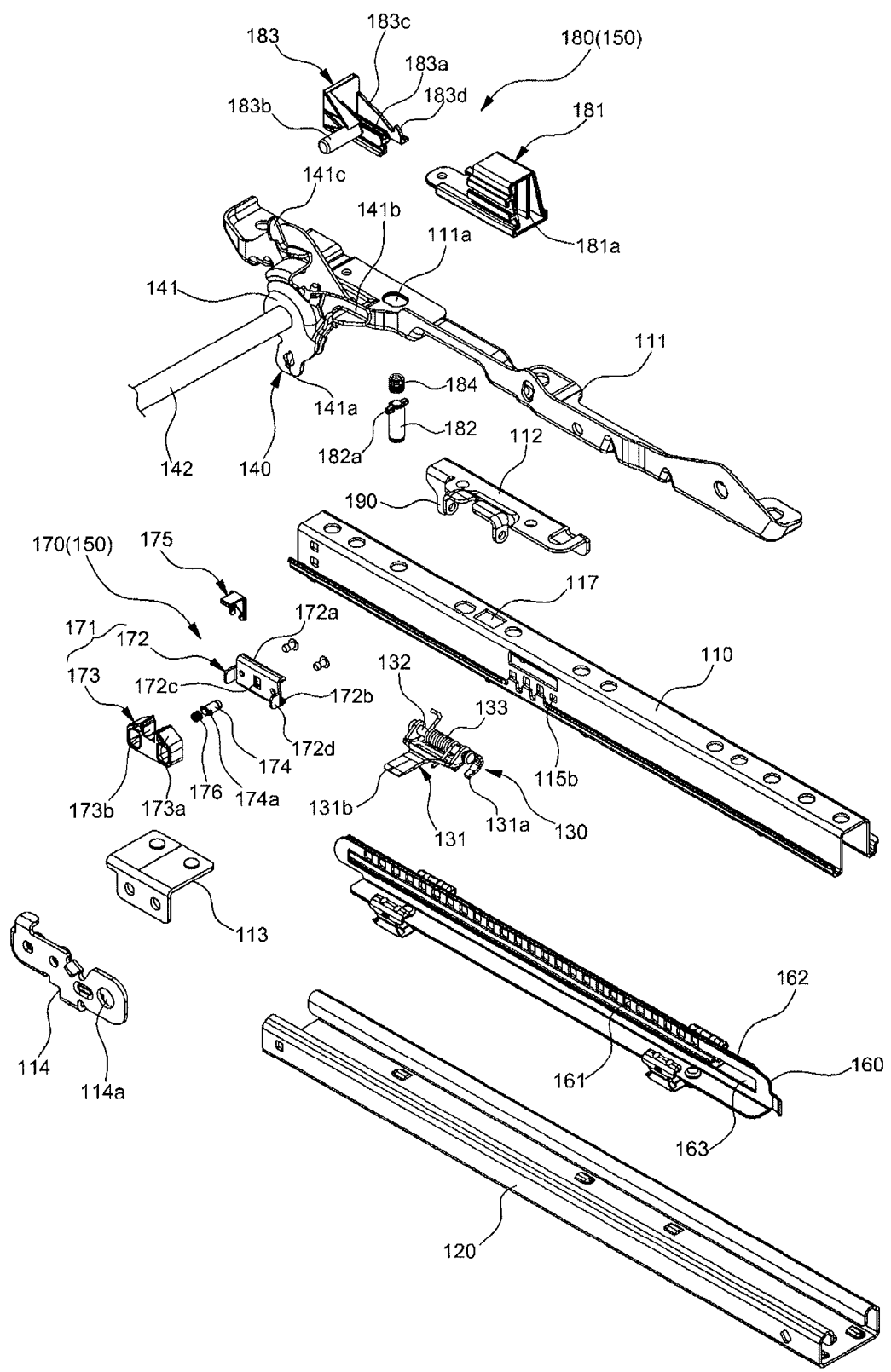
FIGS. 5 and 6 are exploded perspective views showing the seat rail apparatus according to the exemplary embodiment of the present invention.
Figure 6:
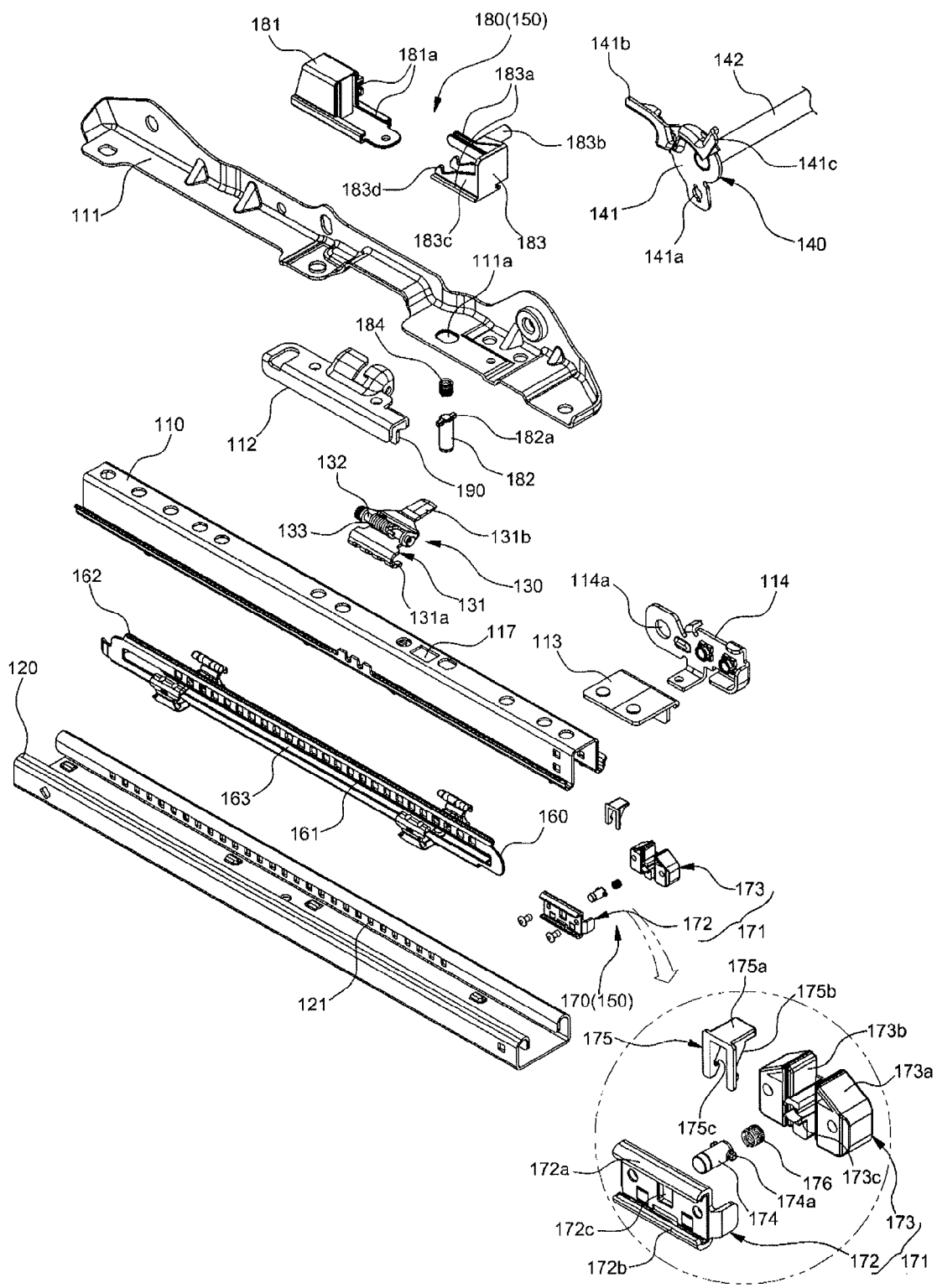

FIGS. 3 and 4 are perspective views showing a seat rail apparatus according to an exemplary embodiment of the present invention. FIGS. 5 and 6 are exploded perspective views showing the seat rail apparatus according to the exemplary embodiment of the present invention.

Figure 7:
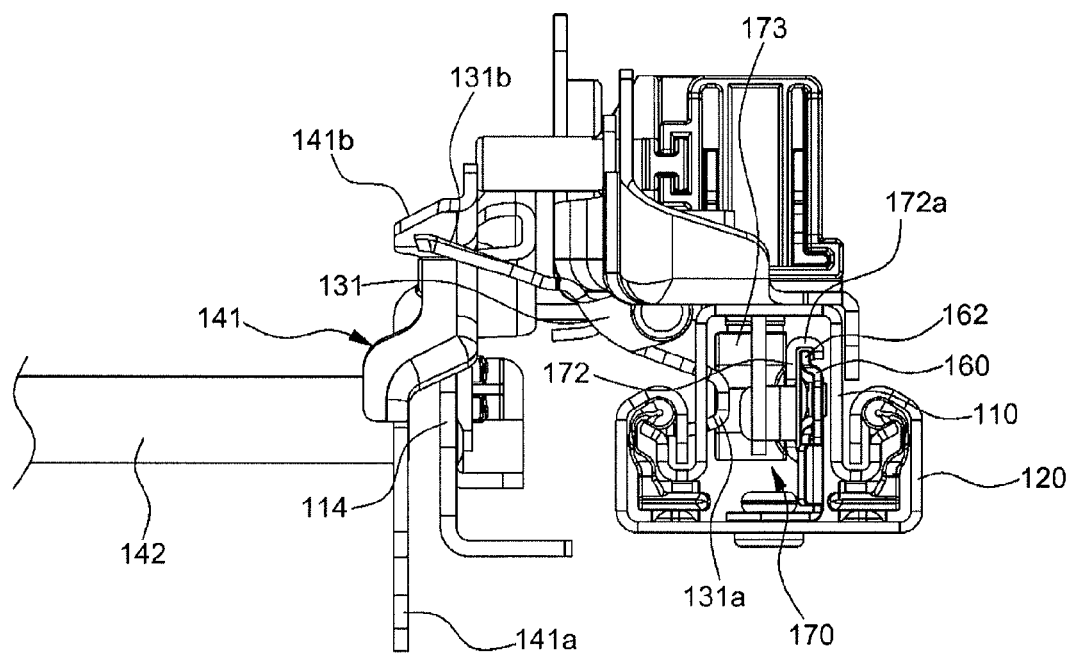
Figure 8:
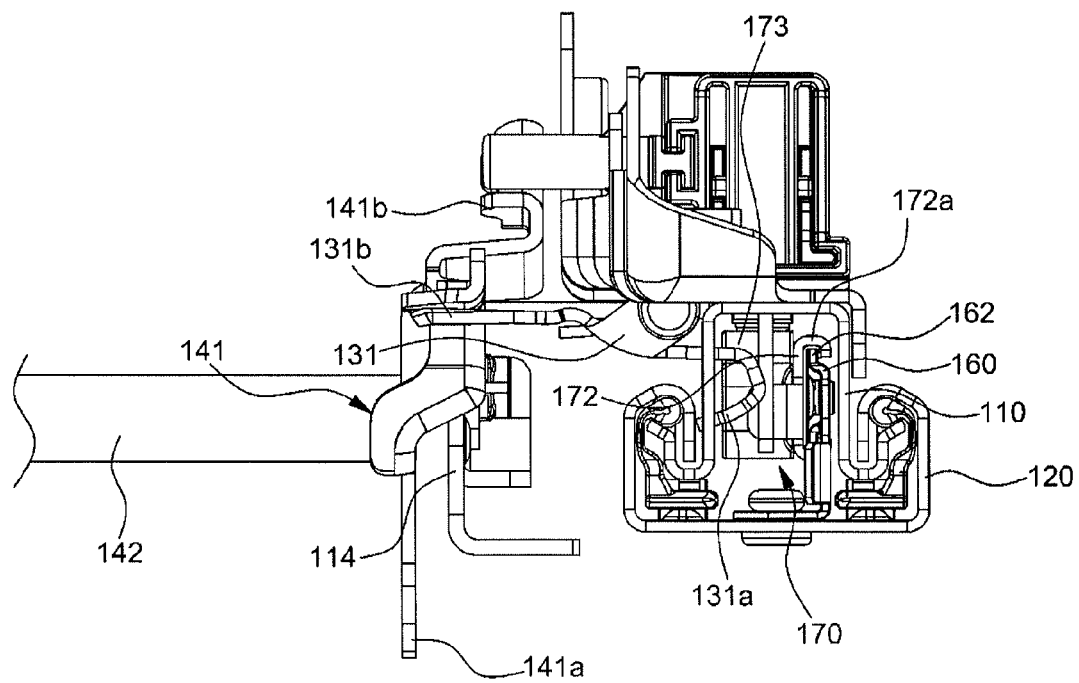

FIGS. 7 and 8 are side views of the seat rail apparatus according to the exemplary embodiment of the present invention. FIG. 7 shows a locked state by a locking lever and FIG. 8 shows an unlocked state.

Figure 9A:
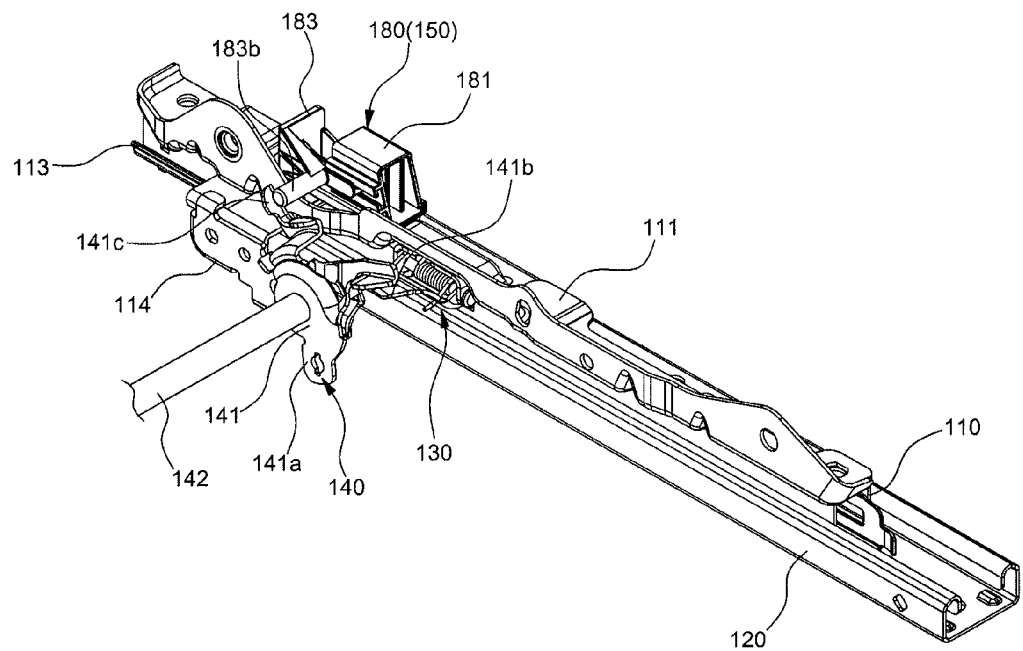
FIG. 9A shows a state before a walk-in lever is rotated and FIG. 9B shows a rotated state of the walk-in lever.
Figure 9B:
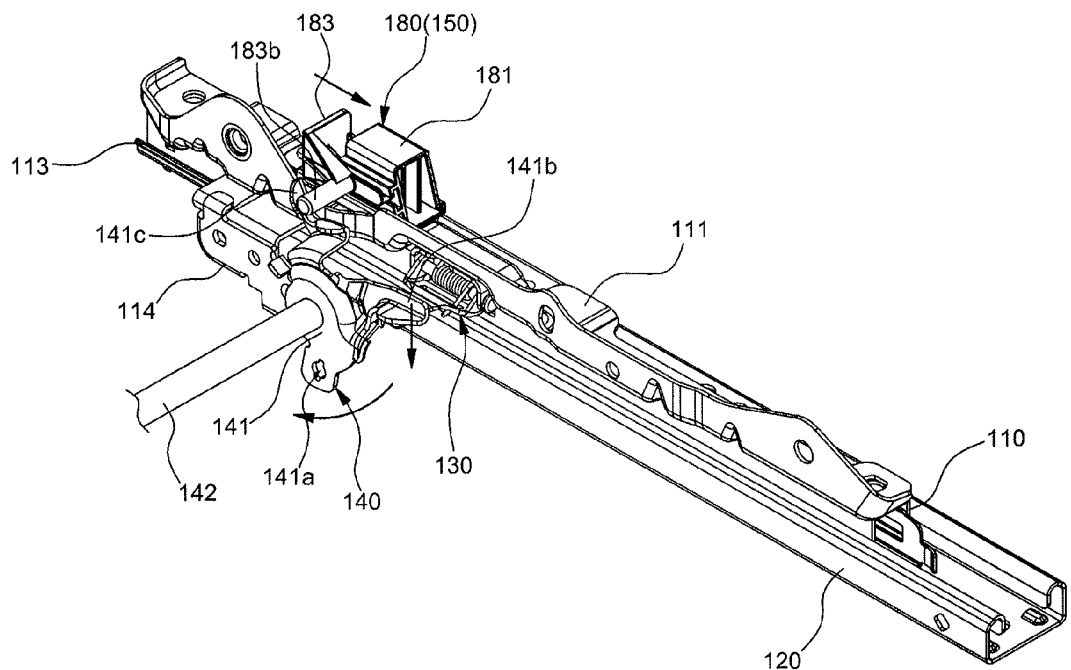
Figure 10A:
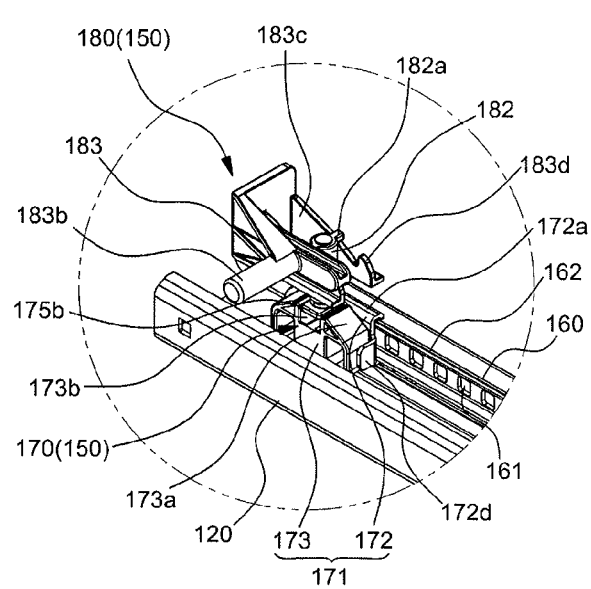
FIGS. 10A, 10B, 10C and 10D are views showing operation state of a memory unit in the seat rail apparatus according to the exemplary embodiment of the present invention.
Figure 10B:
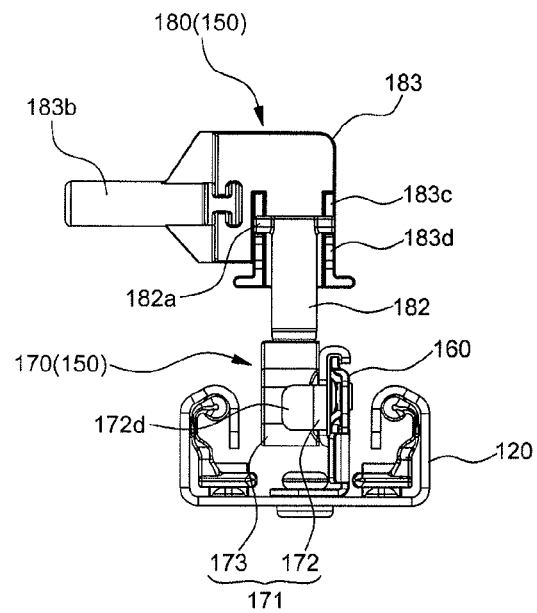
Figure 10C:
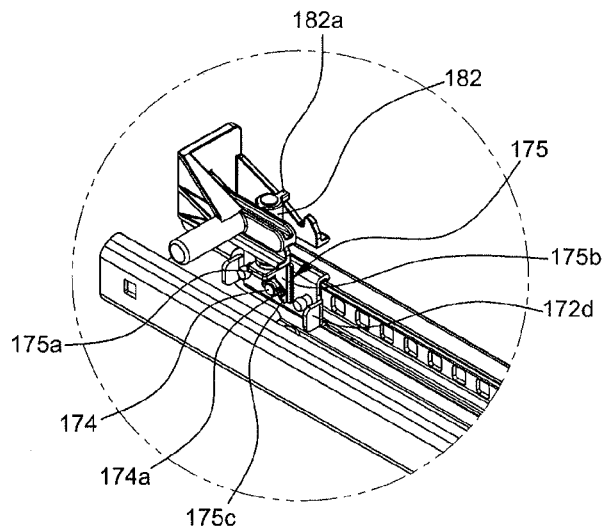
Figure 10D:
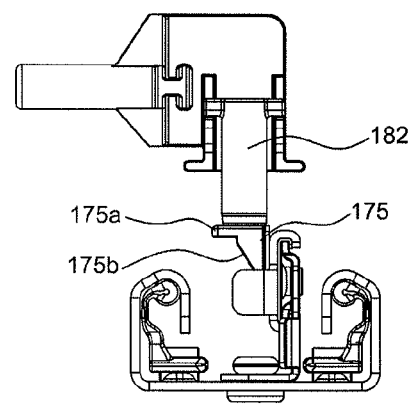
Figure 11A:
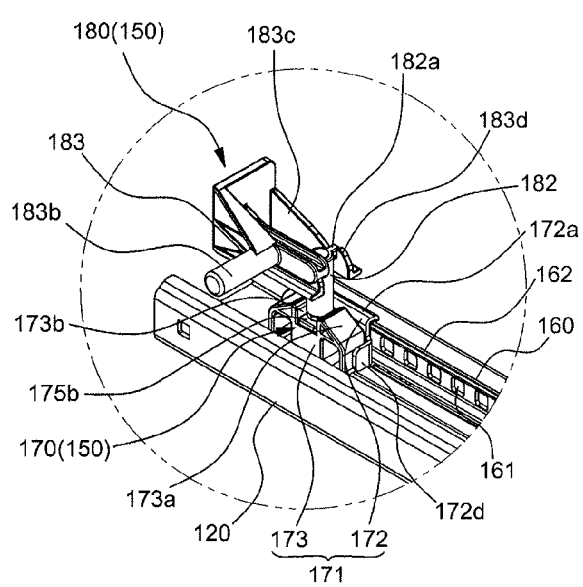
FIGS. 11 A, 11B, 11C and 11D are views showing operation state of a memory unit in the seat rail apparatus according to the exemplary embodiment of the present invention.
Figure 11B:
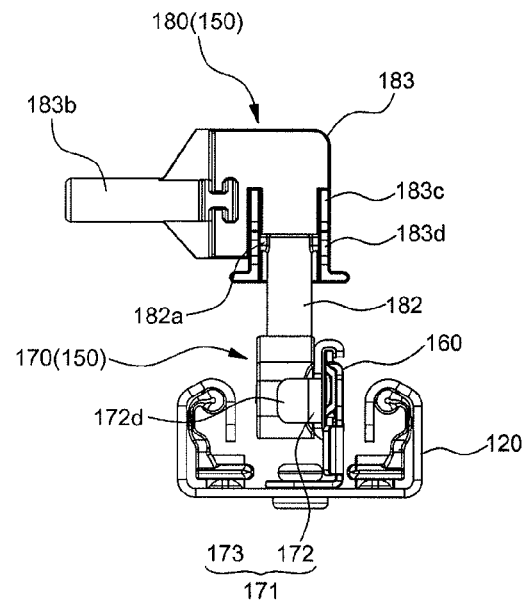
Figure 11C:
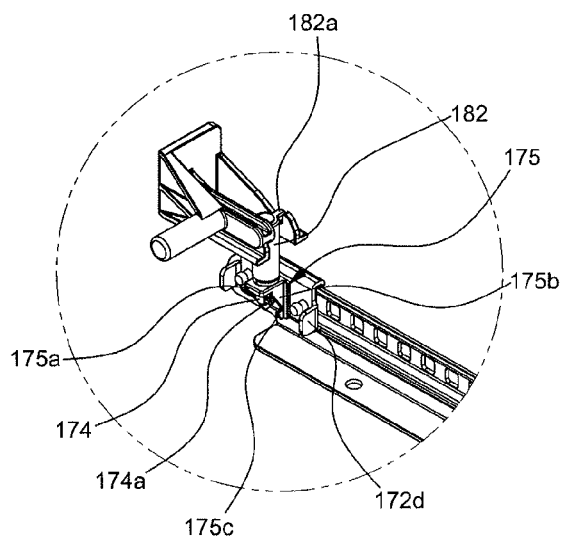
Figure 11D:
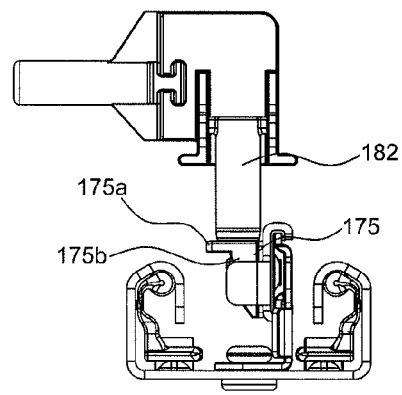

FIG. 9 is an operation state view of the seat rail apparatus according to the exemplary embodiment of the present invention. FIG. 9A shows a state before a walk-in lever 141 is rotated and FIG. 9B shows a rotated state of the walk-in lever 141.

A seat including a seat cushion, a cushion frame, and a seat back is not shown in the drawings, and a vehicle floor to which a lower rail 120 of the seat rail apparatus also is not shown.

First, according to the exemplary embodiment of the present invention, the seat rail apparatus includes an upper rail 110 fixedly mounted to a lower end of the seat, that is, a lower side of a cushion frame, a lower rail 120 fixedly mounted to a bottom surface of the interior of the vehicle (an upper surface of a floor of the vehicle) to movably support the upper rail 110, a locking unit 130 for selectively locking and unlocking the upper rail with and from the lower rail 120, a walk-in lever unit 140 operated to release a locking state of the locking unit 130 by a walk-in cable pulled in conjunction with an operation of a recliner apparatus when a seat back is folded for a walk-in operation, and a memory unit 150 for setting the adjusted position of the seat to a seat return position when a walk-in operation starts while the seat is moved forwards and rearwards such that a position of the seat is adjusted, so that the seat can be moved to the set seat return position during a return of the seat (a walk-in restoration) after the walk-in operation.

The upper rail 110 is a rail that is fixed to the cushion frame mounted to the seat cushion. The upper rail 110 is a rail that is engaged with a lower surface of a mounting bracket 111 integrally mounted to the cushion frame, and is a movable rail that is always integrally moved with the seat forwards and rearwards.

The lower rail 120 is a rail that is fixed to a bottom surface of the interior of the vehicle, that is, an upper surface of the floor. The lower rail 120 is a fixed rail whose position is always fixed in the vehicle, and the upper rail 110 is movably coupled to the lower rail 120.

The lower rail 120 is a rail for movably supporting the upper rail 110 while being fixedly mounted to the floor of the vehicle, and a plurality of locking holes 121 are formed by a predetermined separation along a lengthwise direction of the lower rail 120.

The locking unit 130 is a unit for fixing a position of the upper rail 110 with respect to the lower rail 120 to fix a position of the seat, and includes a locking lever 131 rotatably installed in a fixed bracket 112 fixedly mounted to the upper rail 110, for selectively locking and unlocking the upper rail 110 with and from the lower rail 120 while being rotated.

The locking lever 131 is rotatably mounted to a hinge shaft 132 coupled to the fixed bracket 112, and a return spring 133 for resiliently rotating the unlocked locking lever 131 in a locking direction is installed in the hinge shaft 132.

The return spring 133 is a resilient member that provides a resilient restoring force for rotating the locking lever 131 rotated in an unlocking direction in a locking direction again, and is mounted on the hinge shaft 132 between the locking lever 131 and the fixed bracket 112 to resiliently rotate the locking lever 131 in the locking direction.

The locking lever 131 has locking bosses 131a that can be inserted into locking holes 121 of the lower rail 120, and locks the upper rail 110 with the lower rail 120 such that a position of the upper rail 110 is fixed as the locking bosses 131a are inserted into the locking holes 121 of the lower rail 120 when the locking lever 131 is rotated in the locking direction.

The locking unit 130 locks the upper rail 110 with the lower rail 120 through the locking lever 131 after a forward/rearward position of the seat is adjusted, in order to fix the position of the seat to the adjusted position, and the upper rail 110, the lower rail 120, and the locking unit 130 that selectively locks and unlocks the upper rail 110 with and from the lower rail 120 are known elements that are applied to a general seat rail apparatus.

When an manipulation unit, for example, a track lever at a lower end of the seat that is manipulated by a user such that the seat is moved forwards and rearwards and the position of the seat is adjusted is manipulated, the locking lever 131 of the locking unit 130 is rotated in conjunction with the manipulation state of the track lever.

That is, if the track lever is operated in an unlocking direction (generally, the track lever is pulled), the locking lever 131 is rotated such that the locking bosses 131a are separated from the locking holes 121 of the lower rail 120. Accordingly, the upper rail 110 and the lower rail 120 are unlocked from each other, and then the seat can be moved forwards and rearwards.

If the track lever is released (the pulled state of the track lever is released), the locking lever 131 is rotated to be restored by a resilient restoring force of the return spring 133. Accordingly, the locking bosses 131a are inserted into the locking holes 121 of the lower rail 120 again such that the upper rail 110 and the lower rail 120 are locked with each other.

While the locking lever 131 is inserted into the upper rail 110, the locking bosses 131a thereof penetrate an outside of the upper rail 110 again to be locked with the locking holes 121 of the lower rail 120. In FIG. 5, reference numeral 115a denotes an upper lever hole which the locking lever 131 penetrates such that the locking lever 131 penetrates an inside of the upper rail 110, and reference numeral 115b denotes lower boss holes which the locking bosses 131a penetrate toward an outside of the upper rail 110.

A pressed end 131b is formed at one side of the locking lever 131. The pressed end 131b is a portion that is pressed when the track lever is manipulated. When the track lever is operated in an unlocking direction, the locking lever 131 is rotated in an unlocking direction while the pressed end 131b is pressed by a pressing end 141b of the walk-in lever 141, and then the locking bosses 131a is separated from the locking holes 121 of the lower rail 120 while being extracted from the locking holes 121 of the lower rail 120 such that the locking bosses 131a can be unlocked.

The locking/unlocking operation of the locking lever 131 may be performed through manipulation of the track lever, but also may be performed through an operation of the walk-in lever unit 140 when a walk-in operation of the seat starts and a walk-in return of the seat ends (after the return of the seat), which is a known technical item in the field of a seat having a walk-in function, that is, a walk-in seat.

Briefly, the walk-in lever unit 140 includes a lever to which a walk-in cable is connected, that is, the walk-in lever 141, and the walk-in lever 141 is mounted to and supported by an end of a pipe 142 that is installed lengthwise leftwards and rightwards at a lower side of the seat.

The same or similar constituent elements of the seat rail apparatus shown in FIGS. 3 to 6 are provided at left and right sides of the seat. The pipe 142 supports an opposite walk-in lever 141, and the shown walk-in lever 141 is mounted to one end of the pipe 142 and another walk-in lever 141 located at an opposite side with respect to the seat is mounted to an opposite end of the pipe 142.

Thus, when one walk-in cable connected to the shown walk-in lever 141 is pulled such that the lever 141 and the pipe 142 are rotated, the walk-in lever 141 located at an opposite side also is rotated to perform the same operation.

The walk-in lever 141 and the pipe 142 are supported by brackets integrally coupled to the upper rail 110, that is, a first bracket 113 and a second bracket 114, and the pipe 142 and the walk-in lever 141 mounted thereto are rotatably supported by the upper rail 110 as an end of the pipe 142 is inserted into a hole 114a of the second bracket 114 to be coupled to the second bracket 114.

A cable connector 141a to which a walk-in cable is connected is formed at one side of the walk-in lever 141, and a pressing end 141b that presses the pressed end 131b of the locking lever 131 according to a rotation state of the walk-in lever 141 protrudes from an opposite side of the walk-in lever 141.

Thus, if the seat back is folded after an operation lever (reference numeral 9 of FIG. 1) is manipulated by a user for a walk-in operation, the walk-in cable is pulled in conjunction with the folding of the seat back and then the walk-in cable pulls the cable connector 141a.

As a result, the walk-in lever 141 is rotated by the walk-in cable (the center of rotation of the walk-in lever is the pipe), and the pressing end 141 presses the pressed end 131b to rotate the locking lever 131 in an unlocking direction as the walk-in lever 141 is rotated.

For example, if the user manipulates the track lever to adjust a forward/rearward position of the seat, the upper rail 110 and the lower rail 120 are unlocked from each other while the locking lever 131 is rotated in the unlocking direction and then a position of the seat can be adjusted by moving the seat forwards and rearwards.

In addition, if the seat back is folded after the operation lever is manipulated for a walk-in operation, the walk-in cable is automatically pulled to rotate the walk-in lever 141 and the upper rail 110 and the lower rail 120 are unlocked from each other while the locking lever 131 is rotated in the unlocking direction through rotation of the walk-in lever 141. Accordingly, a walk-in operation for moving the seat forwards can be performed.

In this way, the walk-in lever 141 is rotated while the walk-in cable is pulled during the folding of the seat back and accordingly the locking lever 131 is rotated to be separated from the locking holes 121 of the lower rail 120 such that the upper rail 110 and the lower rail 120 are unlocked from each other, whereas the locking lever 131 is rotated in the locking direction by a return spring 133 during the unfolding of the seat back while the pulled state of the walk-in cable is released and the walk-in lever 141 is rotated in an opposite direction.

Meanwhile, in a state in which the seat is moved forwards and rearwards such that a position of the seat is adjusted before the walk-in operation, the memory unit 150 performs a function of setting the seat return position during a walk-in return to the adjusted seat position (that is a seated position of a passenger and becomes a memory position) and memorizing the seat return position through a walk-in manipulation (folding of the seat back).

When the position of the seat is restored after the walk-in operation (that is, during the walk-in return), the memory unit 150 performs a function of stopping the seat to hold the position of the seat to be fixed again if the seat reaches the seat return position (the memory position) (allows the seat to move to the memory position).

If the position of the seat is restored to the set seat return position by the memory unit 150, the locking unit 130 is locked again in conjunction with an operation of the walk-in lever unit 140 due to the unfolding of the seat back to fix the position of the seat.

Further, the memory unit 150 is operated to be fixed to the seat in conjunction with the operation of the walk-in lever unit 140 due to the unfolding of the seat back, and from then, the memory unit 150 is brought into an integral state with the seat in which the memory unit 150 can be integrally moved with the seat when the locking unit 130 is unlocked to adjust the forward/rearward position of the seat.

Here, the unfolding of the seat back refers to a manipulation of unfolding the folded seat back upwards again, that is, a manipulation of rotating the seat back upwards when a walk-in operation is performed by a user.

The memory unit 150 includes a guide rail 160 fixedly installed lengthwise along an inside of the lower rail 120, a lock assembly 170 installed in the guide rail 160 to be movable along a lengthwise direction thereof such that the lock assembly 170 is selectively locked or unlocked with and from the guide rail 160, a driving assembly 180 for operating the lock assembly 170 such that the lock assembly 170 is selectively locked and unlocked with and from the guide rail 160 and the upper rail 110 according to rotation of the walk-in lever 141, and a stopper 190 installed in the upper rail 110, for stopping the seat while contacting the lock assembly 170 locked with the guide rail 160 during a return of the seat (during a walk-in restoration) after the walk-in operation.

Here, the guide rail 160 is coupled and fixed to a bottom surface of the lower rail 120 at an inside of the lower rail 120, and a plurality of locking holes 161 are formed at a predetermined separation along a lengthwise direction of the guide rail 160.

A rail part 162 to which the lock assembly 170 is slidably coupled is formed at upper and lower sides of the guide rail 160 along a lengthwise direction of the guide rail 160.

The lock assembly 170 includes a slider 171 slidably coupled to the rail part 162 of the guide rail 160, a locking pin 174 installed in the slider 171 to be substantially horizontally movable forwards and rearwards, a pin operating part 175 that moves the locking pin 174 such that the locking pin 174 is unlocked from the guide rail 160 when being pressed by the driving assembly 180, and a resilient spring 176 that provides a force for moving the locking pin 174 forwards in a locking direction while resiliently supporting the locking pin 174.

Here, the slider 171 includes a plate 172 having coupling ends 172a and 172b coupled to the rail part 162 of the guide rail 160 at upper and lower ends thereof, and guide blocks 173 bolted to the plate 172 and between which the locking pin 174 is inserted to be moved forwards and rearwards while the locking pin 174 is supported by the guide block 173.

The coupling end 172a engaged with an upper side of the rail part 162 formed along an upper end of the guide rail 160 to be slidably coupled to the upper side of the rail part 162 is bent along an upper end of the plate 172, and the coupling end 172b inserted into and engaged with a slot 163 that is a lower rail part of the guide rail 160 to be slidably coupled to the slot 163 is bent along a lower end of the plate 172.

Each of the guide blocks 173 has an inclined surface 173a at an upper end thereof, and an accommodating part 173c into which the locking pin 174 and the resilient spring 176 are inserted is located within a central recess 173b (see FIG. 6).

The inclined surfaces 173a of the guide blocks 173 are formed at upper ends of the left and right sides (the front and rear sides along a movement direction of the seat and the upper rail when the seat and the upper rail are moved forwards and rearwards) of the central recess 173b to be symmetrical to each other, and both the opposite inclined surfaces 173a are inclined such that they become higher as they go toward the central recess 173b (see FIG. 6).

The left and right inclined surfaces 173a of the slider 171, that is, the left and right inclined surfaces 173a of the guide blocks 173 allow the operating pin 182 of the driving assembly 180, which will be described below, to ascend and cross over the left and right inclined surfaces 173a of the slider 171 toward the central recess 173b while slidably contacting and pressing the left and right inclined surfaces 173a of the slider 171, and are configured such that an end of the operating pin 182 is slid along the inclined surfaces 173a to be inserted into the central recess 173b while the operating pin 182 of the driving assembly 180 protrudes downwards (is moved forwards).

The operating pin 182 protruding downwards is pressed to be moved into the central recess 173b while being operated upwards (rearwards) when a tip end thereof is slid along the inclined surface 173a of the slider 171 (the inclined surface of the guide block).

The locking pin 174 of the lock assembly 170 is resiliently supported by the resilient spring 176 installed within the accommodating part 173c located below the central recess 173b of the guide block 173, and is resiliently moved forwards and rearwards while the resilient spring 176 supports the locking pin 174 of the lock assembly 170 at a rear side thereof.

The locking pin 174 is separated from the locking hole 161 of the guide rail 160 such that the entire lock assembly 170 is movable along the guide rail 160 (unlocked from the guide rail) after the locking pin 174 is retreated by the pin operating part 175, whereas the entire lock assembly 170 is locked with the guide rail 160 to be fixed while the locking pin 174 is inserted into the locking hole 161 of the guide rail 160 after the locking pin 174 is moved forwards by a resilient restoring force of the resilient spring 176.

In this way, as the locking pin 174 is inserted into or separated from the selected locking hole 161 of the guide rail 160, the lock assembly 170 is movable along or fixed to the guide rail 160, in which case the upper rail 110 and the entire seat except for the lock assembly 170 may be moved forwards and rearwards while the lock assembly 170 is fixed (locked with the guide rail) or the lock assembly 170 may be moved along the guide rail 160 together with the upper rail 110 and the seat while the lock assembly 170 is movable (unlocked from the guide rail).

The locking pin 174 has bosses 174a protruding from opposite sides thereof at a rear end thereof.

The pin operating part 175 of the lock assembly 170 is a member for moving the locking pin 174 such that the locking pin 174 is unlocked from the guide rail 160 when the operating pin 182 of the driving assembly 180 is pressed, and has a pressing part 175a for pressing the operating pin 182 of the driving assembly 180 at an upper end thereof and has side walls 175b extending lengthily downwards at the left and right sides of the pressing part 175a.

Then, the pin operating part 175 is assembled such that the pressing part 175a and the left and right side walls 175b are inserted into the central recess 173b of the guide block 173, in which case the pin operating part 175 is movable upwards and downwards in the central recess 173b of the guide block 173 and the locking pin 174 horizontally moved forwards and rearwards is located between the left and right side walls 175b of the pin operating part 175.

Each of the side walls 175b has an inclined surface at a rear end thereof and has an inverse triangular shape as a whole. The inclined surface of the rear end of the side wall 175b is a part which the boss 174b of the locking pin 174 slidably contacts, and when the pin operating part 175 is moved (descends) while being pressed by the operating pin 182 of the driving assembly 180, the locking pin 174 is horizontally moved rearwards while the inclined surface of the rear end of the side wall 175b pushes the boss 174a rearwards (the pin operating part pulls the locking pin rearwards while the pin operating pin descends).

Then, the locking pin 174 is moved rearwards while compressing the resilient spring 176, and then the locking pin 174 is moved forwards by the resilient restoring force of the resilient spring 176 when the pin operating part 175 moved downwards ascends while the pressing by the operating pin 182 of the driving assembly 180 is released.

For example, if the operating pin 182 of the driving assembly 180 presses the pressed part 175a of the pin operating part 175 after the operating pin 182 of the driving assembly 180 descends, the inclined surface of the rear end of the side wall 175b and the boss 174a slidably contact each other while the pin operating part 175 descends and the locking pin 174 is moved rearwards while compressing the resilient spring 176, in which case the lock assembly 170 and the guide rail 160 are unlocked from each other (the locking pin is withdrawn from the locking hole of the guide rail).

Meanwhile, if the operating pin 182 of the driving assembly 180 ascends such that the pressing of the pin operating part 175 is released, the locking pin 174 is moved forwards while being pushed forwards by the resilient restoring force of the resilient spring 176 and then the lock assembly 170 and the guide rail 160 are locked with each other (the locking pin is inserted into the locking hole of the guide rail).

Catching steps 175c protruding such that the bosses 174a of the locking pin 174 are caught by the catching steps 175c are formed at ends (lower ends in the drawing) of the left and right side walls 175b of the pin operating part 175.

Reference numeral 172c of FIG. 6 denotes a hole formed in the plate 172 of the slider 171 such that the locking pin 174 may pass the hole 172c, and the lock assembly 170 is locked by inserting the locking pin 174 into the locking hole 161 of the guide rail 160 after the locking pin 174 passes through the hole 172c.

The stopper 190 is an element for stopping movement of the seat such that the seat is not moved rearwards further if the seat is moved rearwards during a walk-in restoration and reaches a position set by the memory unit 150.

The stopper 190 is provided in the upper rail 110 moved integrally with the seat, and has a position and a shape such that the stopper 190 collides with the slider 171 of the locking assembly 180 when the operating pin 182 of the driving assembly 180 reaches the lock assembly 170, that is, the operating pin 182 reaches a position where the operating pin 182 may coupled to an inside of the recess 173b of the slider 171 to press the pin operating part 175.

In the exemplary embodiment, the stopper 190 may have a shape protruding lengthily downwards from one side of the fixed bracket 112 to which the locking lever 131 is mounted such that the stopper 190 may collide with a side of the slider 171.

A contact end 172d protrudes from the plate 172 of the slider 171 to be located at a side of the guide block 173, in which case the contact end 172d acts as a part of the slider, that is, a side part of the slider with which the stopper 190 collides and the upper rail 110 and the seat are stopped if the stopper 190 contacts and collides with the contact end 172d.

Meanwhile, the driving assembly 180 is an element installed at the upper rail 110 and includes the operating pin 182 that is vertically operated forwards and rearwards according to rotation of the walk-in lever 141. The operating pin 182 is moved forwards (that is, moved downwards) to unlock the lock assembly 170 from the guide rail 160 or is moved rearwards (that is, moved upwards) to lock the lock assembly 170 with the guide rail 160.

If the operating pin 182 of the driving assembly 180 is moved forwards, the operating pin 182 is coupled to the lock assembly 170 (in more detail, the recess of the slider) such that the upper rail 110 and the lock assembly 170 are connected to each other while the lock assembly 170 and the guide rail 160 are unlocked from each other, so that the upper rail 110, the driving assembly 180, the lock assembly 170 are integrally operated.

If the upper rail 110 and the lock assembly 170 are integrally operated (locked with each other) by the operating pin 182 of the driving assembly 180, the lock assembly 170 unlocked from the guide rail 160 may be moved integrally with the upper rail 110, so that the lock assembly 170 may be moved along the guide rail 160 and the upper rail 110 may moved along the lower rail 120 when the seat is moved forwards and rearwards.

That is, the lock assembly 170 and the upper rail 110 are locked with each other (integrally operated) not during a walk-in operation but during a normal use thereof, the lock assembly 170 may be moved along the guide rail 160 together with the seat when the user moves the seat forwards and rearwards to adjust the position of the seat.

The fact that the operating pin 182 of the driving assembly 180 is coupled such that the lock assembly 170 and the upper rail 110 are integrally operated means that all of the driving assembly 180, the lock assembly 170, and the upper rail 110 are integrally fixed. That is, it means that the memory unit 150 and the upper rail 110 of the seat are integrally fixed.

If the operating pin 182 of the driving assembly 180 is moved rearwards for a walk-in operation after the lock assembly 170 and the upper rail 110 is integrally operated (locked with each other), the integral operation of upper rail 110 and the lock assembly 170 is released while the operating pin 182 is separated from the lock assembly 170.

Then, since the lock assembly 170 and the guide rail 160 are locked with each other, the upper rail 110 and the driving assembly 180 are moved when the seat is moved forwards during a walk-in operation, but the lock assembly 170 is fixed to the guide rail 160 at a former seat position.

In this way, since the lock assembly 170 is fixed to the guide rail 160 instead of moving the seat, and the upper rail 110 and the driving assembly 180 attached thereto, a former seat position may be memorized as a set position.

If the stopper 190 installed at the upper rail 110 contacts the lock assembly 170 (the slider) locked with the guide rail 160 when the seat is moved rearwards during a walk-in operation afterwards, the movement of the seat is restricted by the contact, making it impossible to move the seat rearwards further.

If the seat is unfolded in this state, the operating pin 182 of the driving assembly 180 is coupled to the lock assembly 170 (the recess of the slider) and the locking lever 131 is locked with the lower rail 120, making it possible to fix the seat at a position set (memorized) by the lock assembly 170.

The driving assembly 180 includes a guide member 181 installed to be fixed to the upper rail 110, an operating pin 182 installed in the guide member 181 to be moved forwards and rearwards substantially vertically (upwards and rearwards), for locking and unlocking the lock assembly 170 while being coupled to or uncoupled from the lock assembly 170, a pin operating part 183 for moving the operating pin 182 forwards and rearwards according to rotation of the walk-in lever 141, and a resilient spring 184 for providing a force for moving the operating pin 182 to a position where the operating pin 181 is coupled to the lock assembly 170 while resiliently supporting the operating pin 182 in the guide member 181.

The guide member 181 may be fixedly mounted to the upper rail 110, preferably, an upper surface of the mounting bracket 111 coupled to the upper rail 110 and may have a shape having an interior space. The operating pin 182 is installed in the interior space to vertically pass through the upper rail 110.

The pin operating part 183 is assembled in the guide member 181 to be horizontally moved forwards and rearwards, and rails 181a are formed at opposite side ends of the guide member 181.

The rail coupling parts 183a protruding to opposite sides of the pin operating part 183 are inserted into and slidably coupled to the rails 181a of the guide member 181 so that the pin operating part 183 may be slid in the guide member 181 forwards and rearwards.

The operating pin 182 is resiliently supported by the resilient spring 184 in the interior space of the guide member 181, and the operating pin 182 is resiliently operated forwards and rearwards while the resilient spring 184 is supported at a rear side thereof.

As described above, the operating pin 182 is coupled to the recess 173b provided in the slider 171 of the lock assembly 170, and then the operating pin 182 presses the pin operating part 175 of the lock assembly 170 to release the locked state of the lock assembly 170 (with the guide rail).

The upper rail 110 and the memory unit 150 are integrally operated while the operating pin 182 is inserted into the recess 173b to be coupled to the lock assembly 170.

Meanwhile, if the operating pin 182 is moved rearwards by the pin operating part 183 and is separated from the lock assembly 170, the integral operation of the upper rail 110 and the memory unit 150 is released and the lock assembly 170 is operated to be locked with the guide rail 160 at the same time as described above (the locking pin is moved forwards and is inserted into the locking hole of the guide rail).

The operating pin 182 has a structure in which the bosses protrude from opposite sides of the operating pin 182 at a rear end thereof and passes through the mounting bracket 111 and the upper rail 110 to be vertically moved upwards and rearwards. Reference numerals 111a and 117 of FIG. 6 denote a hole of the mounting bracket 111 and a hole of the upper rail 110 through which the operating pin 182 vertically passes.

The pin operating part 183 of the driving assembly 180 is pressed by the walk-in lever 141 that is rotated while being pulled by a walk-in cable when the walk-in operation starts, and accordingly, the pin 183b pressing a protrusion 141c of the rotated walk-in lever 141 protrudes laterally from one side of the pin operating part 183.

Side walls 183c are formed at the left and right sides of the pin operating part 183, and the operating pin 182 is assembled in the guide member 181 to be located between the side walls 183c.

Each of the side walls 183c has an inclined surface at an upper end thereof to have a triangular shape as a whole. The inclined surface of the side wall 183c is a part which the boss 182a of the operating pin 182 slidably contacts. When the pin operating part 183 is horizontally moved forwards while being pressed by the walk-in lever 141, the inclined surface of the side wall 183c moves the operating pin 182 rearwards while pushing the boss 182a upwards (the pin operating part pulls the operating pin upwards).

Then, the operating pin 182 is moved rearwards (ascends) while compressing the resilient spring 184, and then if the pressing of the pin operating part 183 by the walk-in lever 141 is released, the operating pin 182 is moved forwards (descends) by the resilient restoring force of the resilient spring 184.

Catching steps 183d protruding such that the bosses 182a of the operating pin 182 are caught downwards by the catching steps 183d are formed at ends of the left and right side walls 183c of the pin operating part 183.

The configuration of the present invention has been described until now, and an operation of the present invention will be described in detail hereinbelow.

FIG. 8 is a view showing a state in which a passenger may move the seat forwards and rearwards in correspondence to his or her body shape in a normal situation, that is, a state in which the position of the seat may be adjusted by pulling the track lever.

Figure 12:
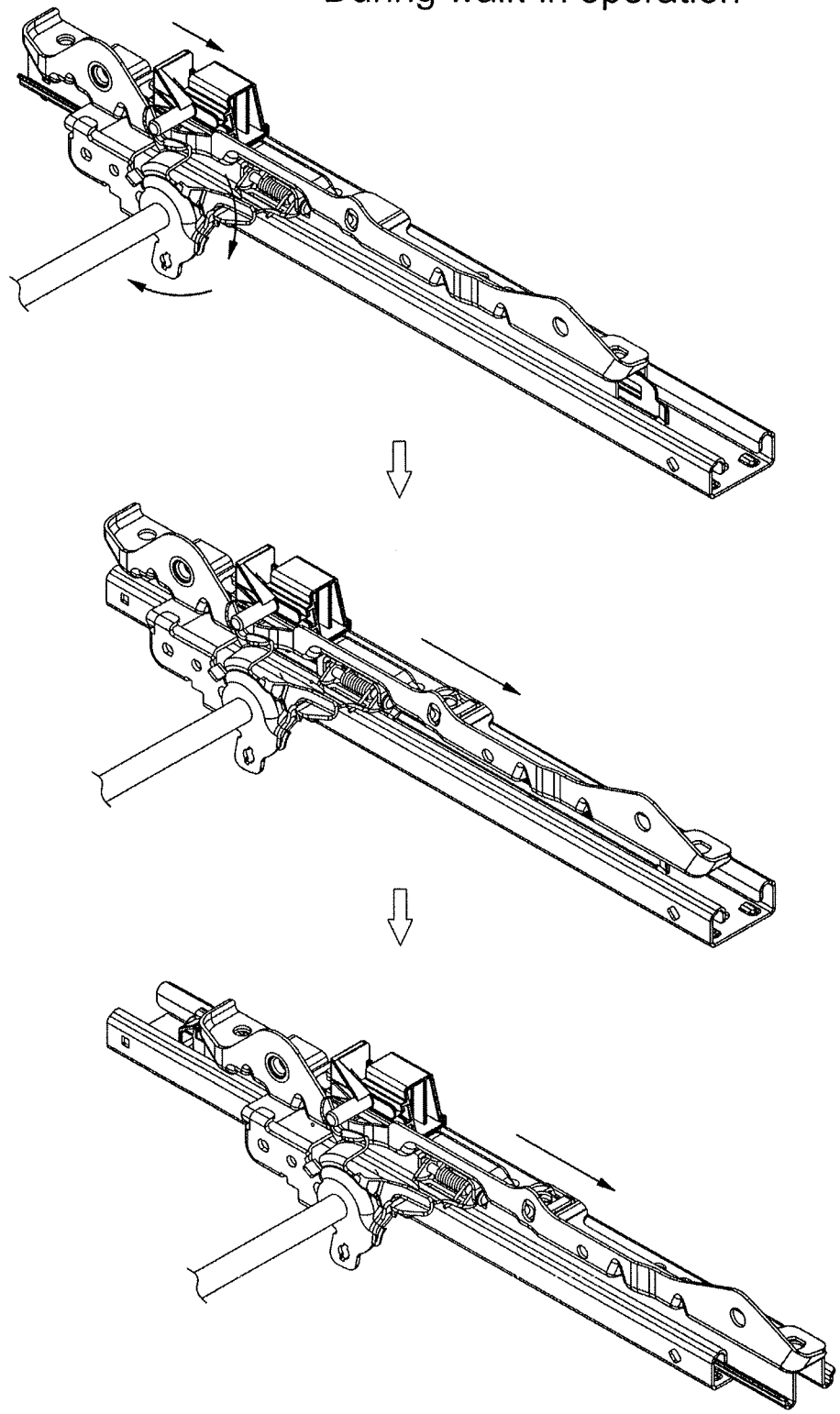
FIGS. 12 and 13 are views showing states of a walk-in operation in the seat rail apparatus according to the exemplary embodiment of the present invention.
Figure 13:
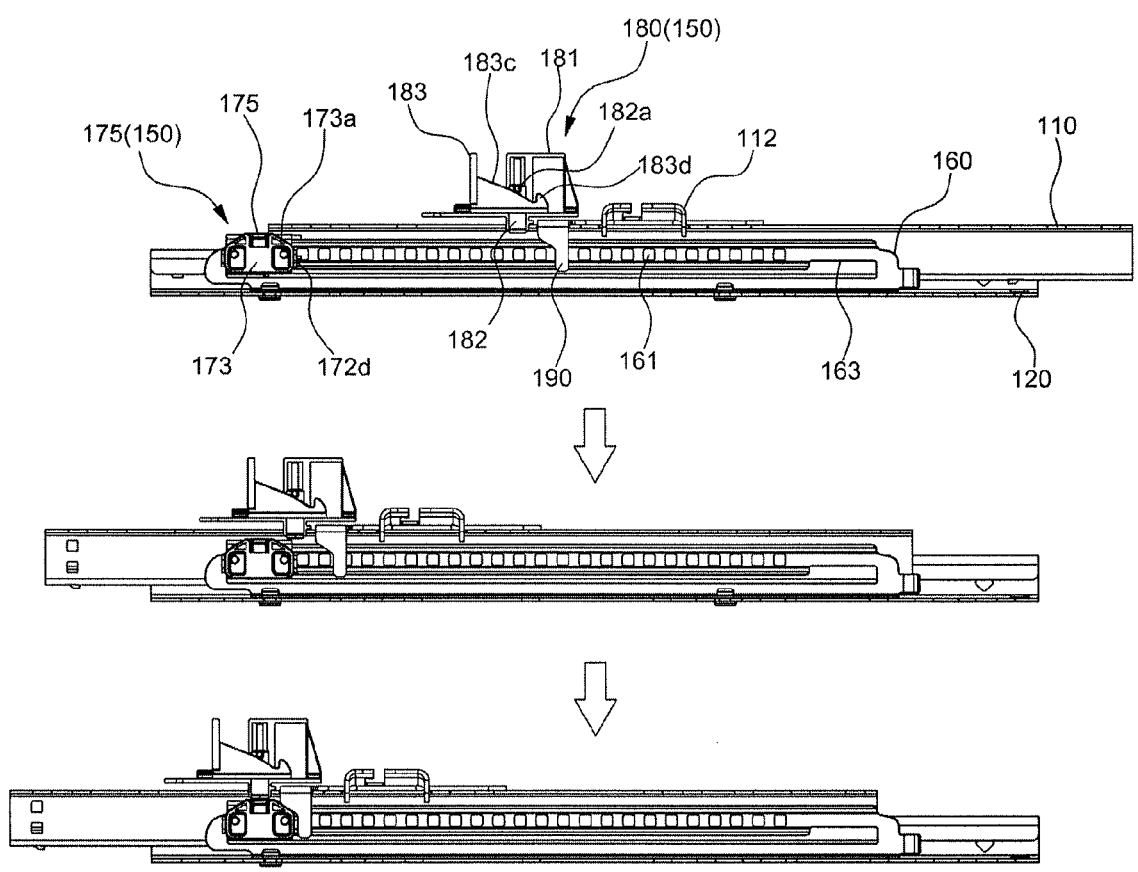

FIG. 9 is an operation state view of the seat rail apparatus according to the exemplary embodiment of the present invention, wherein FIG. 9A shows a state before a walk-in lever is rotated and FIG. 9B shows a rotated state of the walk-in lever, FIGS. 10 and 11 are views showing operation state of a memory unit in the seat rail apparatus according to the exemplary embodiment of the present invention, and FIGS. 12 and 13 are views showing states of a walk-in operation in the seat rail apparatus according to the exemplary embodiment of the present invention.

Figure 14:
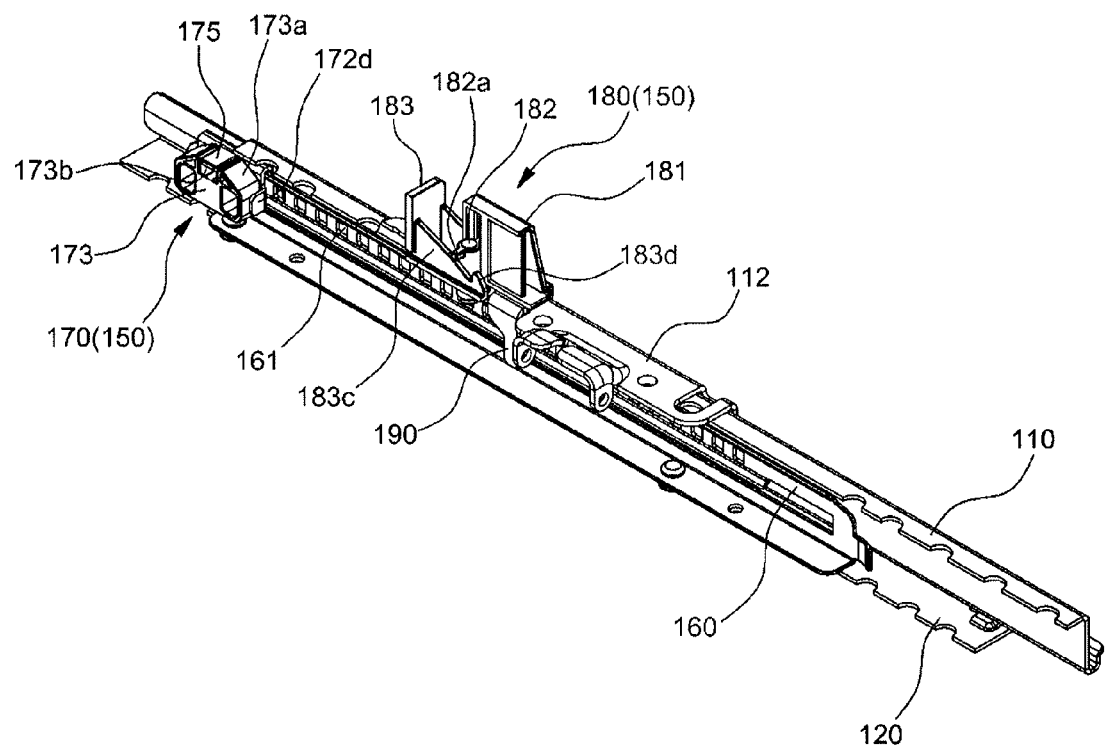
FIG. 14 is a view showing a state in which an upper rail and a driving assembly are moved while a lock assembly is fixed during a walk-in operation in the seat rail apparatus according to the exemplary embodiment of the present invention.
Figure 15:
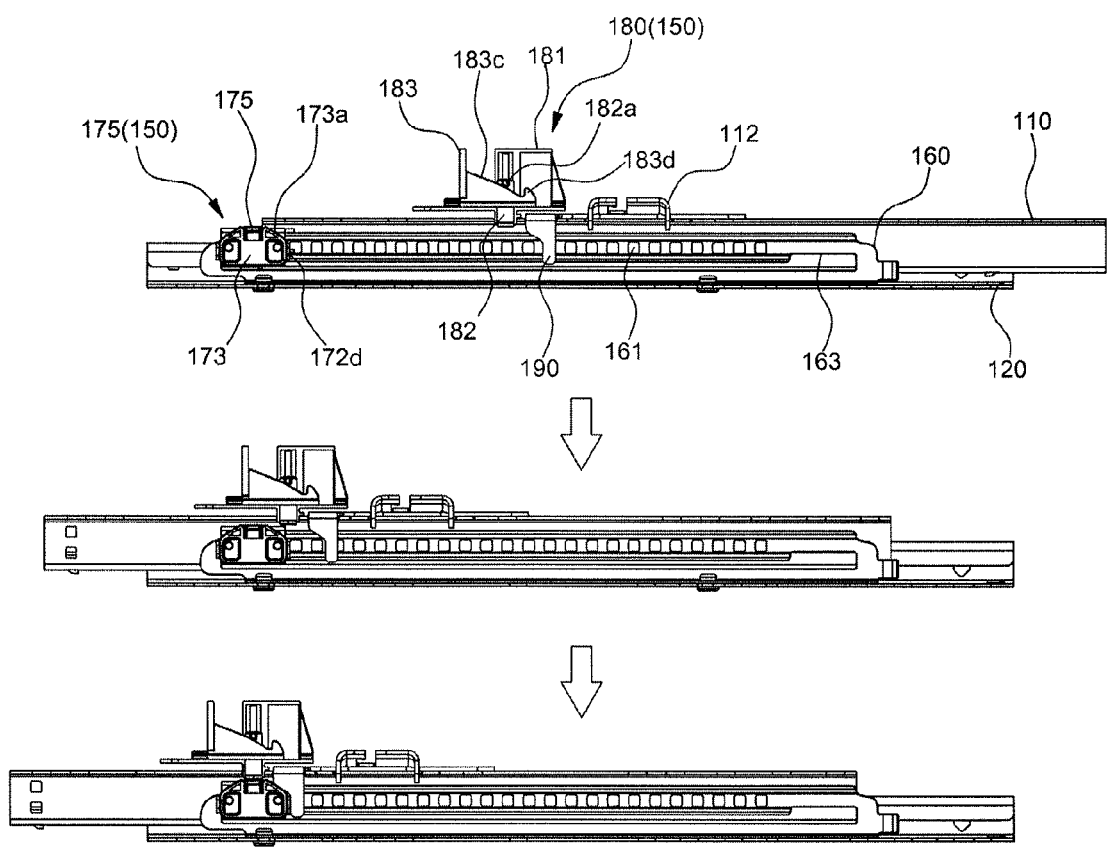
FIG. 15 is a view showing a state during a walk-in return in the seat rail apparatus according to the exemplary embodiment of the present invention.
Figure 16:
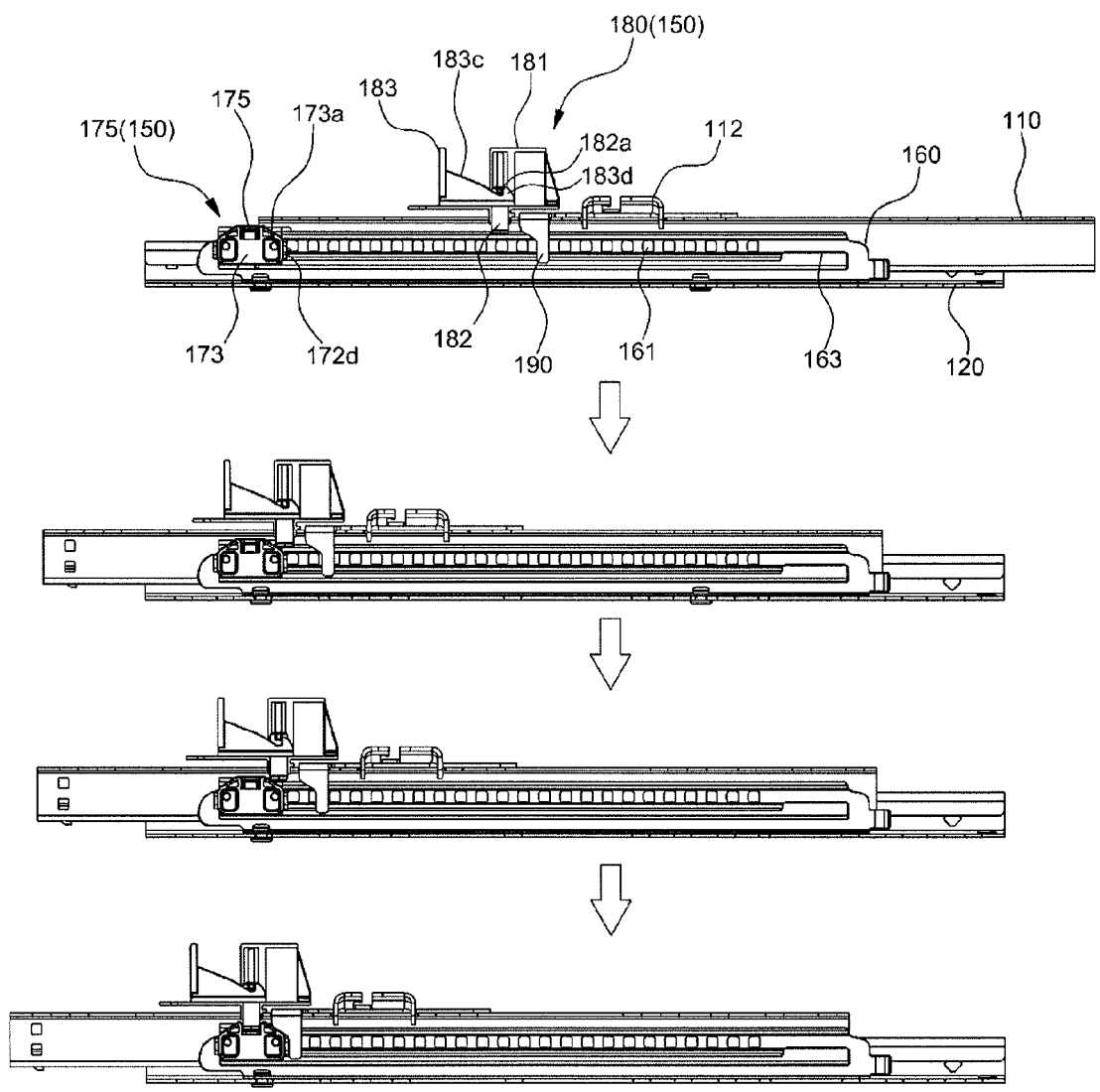
FIG. 16 is a view showing a state in which a walk-in return is performed while a seat back is erected in advance in the seat rail apparatus according to the exemplary embodiment of the present invention.

FIG. 14 is a view showing a state in which an upper rail and a driving assembly are moved while a lock assembly is fixed during a walk-in operation in the seat rail apparatus according to the exemplary embodiment of the present invention. FIG. 15 is a view showing a state during a walk-in return in the seat rail apparatus according to the exemplary embodiment of the present invention. FIG. 16 is a view showing a state in which a walk-in return is performed while a seat back is erected in advance in the seat rail apparatus according to the exemplary embodiment of the present invention.

As shown in FIG. 11, the operating pin 182 of the driving assembly 180 is normally moved forwards and is inserted into the recess 173b provided in the slider 171 of the lock assembly 170, in which case the upper rail 110 mounted to the cushion frame of the seat, the driving assembly 180 installed at the upper rail 110, and the lock assembly 170 on the guide rail 160 are integrally moved while the operating pin 182 is coupled to the lock assembly 170.

Further, since the lock assembly 170 and the guide rail 160 are unlocked from each other, the lock assembly 170 may be freely moved along the guide rail 160 when the seat is moved forwards and rearwards.

Then, if the passenger adjusts the track lever, the locking lever 131 mounted to the upper rail 110 is unlocked from the lower rail 120 while being separated from the lower rail 120, in which state if the seat is moved forwards and rearwards, the entire memory unit 150 including the lock assembly 170 and the driving assembly 180 is moved integrally with the upper rail 110 and the seat.

When the seat is moved forwards and rearwards, both the driving assembly 180 and the lock assembly 170 are moved at the same time (the entire memory unit is moved together with the seat), and if the passenger releases the track lever after the position of the seat is adjusted, the locking lever 131 is locked with the lower rail 120 again such that the position of the seat is fixed.

FIGS. 12 and 13 is a view showing a walk-in operation, in which if the passenger adjusts the operating lever (reference numeral 9 of FIG. 1) to fold the seat back while the forward and rearward position of the seat is already adjusted, the walk-in cable is pulled and the walk-in lever 141 is rotated.

Accordingly, the locking lever 131 is rotated in an unlocking direction by the walk-in lever 141, and consequently, the locked state of the upper rail 110 and the lower rail 120 by the locking lever 131 is released (the seat and the floor are unlocked) while the locking lever 131 is separated from the locking hole 121 of the lower rail 120 such that the seat may be moved forwards and rearwards like during the manipulation of the track lever.

At the same time, the rotated walk-in lever 141 operates the memory unit 150 such that the currently adjusted position of the seat (the former seated position of the passenger) is set to a seat return position (that is, a memory position) during a walk-in restoration afterwards (the adjusted position of the seat is memorized).

Then, the pin operating part 183 is moved (toward the guide member) while the protrusion 141c of the rotated walk-in lever 141 presses the pin 183b installed in the pin operating part 183 of the driving assembly 180, and then the operating pin 182 is pulled upwards while the boss 182a is slid along the inclined surface of the pin operating part 183 (see FIG. 10).

Accordingly, the operating pin 182 may be separated from the lock assembly 170, in which case a force pressing the pin operating part 183 of the lock assembly 170 is removed while the operating pin 182 is withdrawn from the recess 173b provided in the slider 171 (see FIG. 10).

As a result, the locking pin 174 of the lock assembly 170 is moved forwards by the resilient restoring force of the resilient spring 176 and is inserted into the locking hole 161 of the guide rail 160, and accordingly, the lock assembly 170 and the guide rail 160 are locked.

Thus, the lock assembly 170 is fixed to the guide rail 160 at the adjusted position of the seat, and the position of the lock assembly then is set to the return position of the seat (the seated position of the passenger) during a walk-in restoration.

The passenger secures a space by moving the seat forwards in this state, in which case the driving assembly 180 including the operating pin 182 and the upper rail 110 are moved integrally with the seat while the lock assembly 170 is fixed to the guide rail 160 when the seat is moved forwards during a walk-in operation (see FIGS. 12 and 13).

Next, FIG. 15 is a view showing a walk-in restoration, in which the passenger moves the seat rearwards to an original position while the seat back is folded, in which case the passenger moves the seat rearwards to an original position while the seat back is folded, and then the seat is stopped if the stopper 190 installed at the upper rail 110 contacts a side of the slider 171 of the lock assembly 170, that is, the contact end 172d of the slider.

In this way, since the seat may be moved to a position where the lock assembly 170 is fixed, the finally moved position of the seat is the former seated position, that is, a position set by the lock assembly 170 during a walk-in operation.

If the seat back is unfolded in this state, a force pressing the pin operating part 183 is released through the walk-in lever 141 while the pulling of the walk-in cable is released, and then the operating pin 182 of the driving assembly 180 is moved forwards (descends) by a resilient restoring force of the resilient spring 184.

In this way, the pin operating part 183 is moved in an opposite direction to the direction during a walk-in operation while the operating pin 182 is moved forwards, and the walk-in lever 141 is also rotated in an opposite direction to the direction during the walk-in operation.

The locking lever 131 is inserted into the locking hole 121 of the lower rail 120 at the moved position of the seat while the walk-in lever 141 is rotated such that the upper rail 110 and the lower rail 120 are unlocked from each other, so that the position of the seat is fixed again.

In addition, the operating pin 182 moved forwards together is inserted into the recess 173b provided in the slider of the lock assembly 170, in which case the driving assembly 180 and the lock assembly 170 are integrally operated and the lock assembly 170 and the guide rail 160 are unlocked from each other.

That is, if the operating pin 182 presses the pin operating part 175 of the lock assembly 170, the locking pin 174 is pulled downwards by the descending pin operating part 175 to be withdrawn from the locking hole 161 of the guide rail 160 and accordingly the lock assembly 170 and the guide rail 160 are unlocked from each other.

Thereafter, if the seat is moved forwards and rearwards such that the position of the seat is readjusted, the lock assembly 170 is also moved together with the seat since the lock assembly 170 of the memory unit 150 is connected to the driving assembly 180 of the upper rail 110 by the operating pin 182. Then, the lock assembly 170 is locked with the guide rail 160 again such that the position of the seat is memorized when an walk-in operation is performed at the readjusted position.

Next, FIG. 16 is a view showing a walk-in restoration, in which the passenger should maintain the folding state of the seat back while the seat is moved rearwards, but erects the seat back in advance.

Passengers usually show a habit of pushing the seat rearwards after unfolding the seat back first, in which case if the seat back is unfolded in advance before the seat reaches a preset position (memory position) while the seat is moved, the walk-in lever 141 is rotated while the pulling of the walk-in cable is released and the operating pin 182 of the driving assembly 180 is moved forwards (descends) first before reaching a position where the operating pin 182 is inserted into the recess 173b of the lock assembly 170.

The upper rail 110 and the lower rail 120 are locked with each other as the locking lever 131 is inserted into the locking hole 121 of the lower rail 120 at a position where the seat is moved while the walk-in lever 141 is rotated, in which case the position of the seat is fixed before the seat reaches the preset position.

Since the passenger can be seated even before the seat reaches a preset position while the seat back is erected, it is preferable to fix the position of the seat for safety.

Thus, if the seat back is erected, the upper rail 110 and the lower rail 120 are locked with each other to fix the position of the seat through an operation of the locking lever 131.

Meanwhile, the seat is moved rearwards while the locking lever 131 is unlocked by pulling the track lever so that the seat may be moved to a preset position, that is, a position memorized by the memory unit (a position where the lock assembly is fixed).

However, while the seat may be moved rearwards when the seat track is unlocked by adjusting the track lever, the operating pin 182 of the driving assembly 180 is moved forwards in advance before reaching the position of the recess 173b of the lock assembly 170

Thus, the inclined surface 173b (the inclined surface of the guide block) is formed on a side surface of the slider 171 of the lock assembly 170, and the operating pin 182 contacts the inclined surface 173a of the slider after being moved (descending) and is moved along the inclined surface 173a to be inserted into and coupled to the central recess 173b of the slider 171.

If the operating pin 182 crosses the central recess 173b along the inclined surface 173a of the lock assembly 170, that is, the inclined surface 173a of the guide block 173, it may be coupled to the recess 173b after being rearwards instantaneously while the operating pin 182 is moved (protrudes), in which state if the track lever is released, the seat may be fixed to a preset position again.

For convenience in explanation and accurate definition in the appended claims, the terms "upper", "lower", "inner"

and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat rail apparatus for a vehicle having a memory unit for setting a position of a seat that has been adjusted to a seat return position when a walk-in operation starts to allow the seat to be moved to the set seat return position when the seat returns after the walk-in operation, the memory unit comprising:
    a guide rail fixedly installed along a lower rail mounted to a bottom surface of an interior of the vehicle;
    a lock assembly installed to be movable along the guide rail in an unlocked state and selectively locked with and unlocked from the guide rail as a locking pin is moved forwards and rearwards;
    a driving assembly integrally installed at an upper rail mounted to a cushion frame, wherein the driving assembly locks the lock assembly with and unlocks the lock assembly from the guide rail by operating the locking pin and locks and unlocks the lock assembly such that the lock assembly is operated integrally with the upper rail according to rotation of a walk-in lever, wherein the driving assembly comprises:
        a guide member fixedly installed at the upper rail; and
        an operating pin installed in the guide member to be moved forwards and rearwards, for locking the lock assembly with and unlocking the lock assembly from the guide rail while being coupled to or released from the lock assembly according to forward and rearward movement of the operating pin; and
    a stopper provided at the upper rail, for contacting the lock assembly that is locked with the guide rail when the seat returns after a walk-in operation to stop the seat.

2. The seat rail apparatus of claim 1, wherein the lock assembly comprises:
    a slider slidably coupled to the guide rail;
    the locking pin installed in the slider to be moved forwards and rearwards to be selectively locked and unlocked with and from the guide rail; and
    a pin operating part installed in a recess of the slider, for moving the locking pin such that the locking pin is unlocked from the guide rail when the pin operating part is pressed by an operating pin of the driving assembly.

3. The seat rail apparatus of claim 1, wherein locking holes for locking the lock assembly with the guide rail as the locking pin is inserted into one of the locking holes are formed in the guide rail at a predetermined separation therebetween.

4. The seat rail apparatus of claim 2, wherein the lock assembly further comprises a resilient spring installed in the slider, for providing a force for moving the locking pin in a locking direction while resiliently supporting the locking pin.

5. The seat rail apparatus of claim 2, wherein the slider has inclined surfaces which the protruding operating pin contacts to be slid and cross the inclined surface to an interior of the recess while being pressed.

6. The seat rail apparatus of claim 5, wherein the inclined surfaces are formed at an upper end of the slider at front and rear sides of the recess with respect to the seat following the lower rail and a forward/rearward movement direction of the upper rail, and both the inclined surfaces become gradually higher as the inclined surfaces go toward the central recess.

7. The seat rail apparatus of claim 2, wherein the slider comprises:
    a plate slidably coupled to the guide rail; and
    a guide block engaged with and coupled to the plate to support the locking pin inserted into the guide block so as to be moved forwards and rearwards and having a recess in which the pin operating part is installed.

8. The seat rail apparatus of claim 7, wherein a contact end is formed in the plate of the slider, and the upper rail and the seat are stopped while the stopper contacts and collides with the contact end when the seat returns after the walk-in operation.

9. The seat rail apparatus of claim 2, wherein the recess of the slider is formed such that the protruding operating pin moved forwards and is inserted into the recess while pressing the pin operating part, and the operating pin is coupled to the lock assembly while being inserted into the recess of the slider such that the lock assembly is locked to be integrally moved integrally with the upper rail.

10. The seat rail apparatus of claim 2, wherein the pin operating part has a pressing part pressed by the operating pin of the driving assembly and has an inclined surface for moving the locking pin forwards and rearwards according to a pressing state and a releasing state by the operating pin of the driving assembly while the locking pin contacts the inclined surface.

11. The seat rail apparatus of claim 10, wherein the pin operating part has side walls extending lengthily downwards at left and right sides of the pressing part, the locking pin moved forwards and rearwards is located between left and right side walls of the pin operating part located within the recess of the slider, and each of the side walls has an inclined surface which left and right bosses of the locking pin slidably contact such that the locking pin is moved while the inclined surfaces of the side walls press the bosses when the pin operating part is moved while being pressed by the operating pin.

12. The seat rail apparatus of claim 11, wherein catching steps that protrude such that the bosses of the locking pin are caught by the catching steps are formed at ends of the left and right side walls of the pin operating part.

13. The seat rail apparatus of claim 1, wherein the stopper is positioned and shaped such that the stopper contacts the locking assembly when the operating pin of the driving assembly reaches a position where the operating pin is coupled to the lock assembly while operating the locking pin such that the lock assembly and the guide rail are unlocked.

14. The seat rail apparatus of claim 13, wherein the stopper protrudes lengthily downwards from a fixed bracket fixedly mounted to the upper rail.

15. The seat rail apparatus of claim 14, wherein the fixed bracket is a bracket in which a locking lever of a locking unit for fixing a position of the seat is rotatably installed.

16. The seat rail apparatus of claim 1, wherein the driving assembly further comprises:

a pin operating part slidably installed in the guide member, for moving the operating pin forwards and rearwards as the pin operating part is slid according to the rotation of the walk-in lever.

17. The seat rail apparatus of claim 16, wherein the driving assembly further comprises a resilient spring installed in the guide member, for providing a force for protruding the operating pin in a coupling direction with the lock assembly while resiliently supporting the operating pin.

18. The seat rail apparatus of claim 16, wherein the pin operating part installed in the guide member to be slid while being pressed by the walk-in lever, for moving the operating pin forwards and rearwards according to a pressing state and a releasing state by the walk-in lever while the operating pin contacts a inclined surface.

19. The seat rail apparatus of claim 18, wherein a pin protrudes laterally lengthily from one side of the pin operating part such that the pin operating part is pressed as a protrusion of the walk-in lever rotated for the walk-in operation presses the pin of the pin operating part.

20. The seat rail apparatus of claim 18, wherein the pin operating part has side walls extending lengthily at left and right sides thereof, the operating pin moved forwards and rearwards is located between the left and right side walls of the pin operating part, and the side walls have inclined surfaces which left and right bosses of the operating pin slidably contact such that the operating pin is moved while the inclined surfaces of the side walls push the bosses when the pin operating part is pressed and moved by the operating pin.

21. The seat rail apparatus of claim 20, wherein catching steps protruding such that the bosses of the operating pin are caught by the catching steps are formed at ends of left and right side walls of the pin operating part.

* * * * *